(12) United States Patent
Ekkundi et al.

(10) Patent No.: US 8,227,599 B2
(45) Date of Patent: Jul. 24, 2012

(54) ADSORBENTS COMPRISING ANTHRAQUINONE DYE-LIGENDS FOR THE SEPARATION OF BIOLOGICAL MATERIALS

(75) Inventors: Vadiraj Subbanna Ekkundi, Aesch (CH); Narayan S. Punekar, Mumbai (IN); Kamalesh Pai Fondekar, Thane (IN); Georg Roentgen, Freiburg (DE); Shilpa S. Korde, Mumbai (IN); Ajit B. Shinde, Navi Mumbai (IN); Masana Moorthy, Mumbai (IN)

(73) Assignee: BASF SE, Ludwigshafen (DE)

( * ) Notice: Subject to any disclaimer, the term of this patent is extended or adjusted under 35 U.S.C. 154(b) by 1087 days.

(21) Appl. No.: 11/887,503

(22) PCT Filed: Mar. 29, 2006

(86) PCT No.: PCT/EP2006/061121
§ 371 (c)(1),
(2), (4) Date: Sep. 28, 2007

(87) PCT Pub. No.: WO2006/108760
PCT Pub. Date: Oct. 19, 2006

(65) Prior Publication Data
US 2009/0081757 A1    Mar. 26, 2009

(30) Foreign Application Priority Data
Apr. 8, 2005 (EP) .................................. 05102776

(51) Int. Cl.
*C07D 251/50* (2006.01)
*C07D 251/52* (2006.01)
*C07D 251/54* (2006.01)
*A61K 31/53* (2006.01)
*C09B 1/20* (2006.01)
*C09B 1/26* (2006.01)
*C09B 62/04* (2006.01)

(52) U.S. Cl. ........ 544/204; 544/208; 544/187; 544/189; 514/241; 514/245; 530/412; 530/413; 530/415; 530/417; 502/401; 502/404

(58) Field of Classification Search .................. 544/204, 544/208, 187, 189; 514/241, 245; 530/412, 530/413, 415, 417; 502/401, 402, 404
See application file for complete search history.

(56) References Cited

U.S. PATENT DOCUMENTS

| | | | | |
|---|---|---|---|---|
| 3,558,621 | A * | 1/1971 | Blen | 544/189 |
| 3,758,467 | A * | 9/1973 | Seitz et al. | 544/189 |
| 4,016,149 | A | 4/1977 | Travis et al. | 260/122 |
| 4,214,082 | A * | 7/1980 | Harms et al. | 544/189 |
| 4,237,284 | A * | 12/1980 | Mislin | 544/189 |
| 4,273,553 | A * | 6/1981 | Harms et al. | 8/549 |
| 4,325,705 | A * | 4/1982 | Harms et al. | 8/676 |
| 4,332,938 | A * | 6/1982 | Harms et al. | 544/189 |
| 4,355,163 | A * | 10/1982 | von Oertzen et al. | 544/189 |
| 4,377,688 | A * | 3/1983 | Harms et al. | 544/189 |
| 4,546,161 | A | 10/1985 | Harvey et al. | 527/312 |
| 4,837,320 | A * | 6/1989 | Harms et al. | 544/189 |
| 5,876,597 | A | 3/1999 | Mazza et al. | 210/198.2 |
| 6,638,740 | B1 | 10/2003 | Goodey et al. | 435/69.6 |

FOREIGN PATENT DOCUMENTS

| | | |
|---|---|---|
| EP | 1247842 A1 * | 10/2002 |
| GB | 1 461 528 | 1/1977 |
| GB | 2 015 552 | 9/1979 |
| WO | 2004/052870 | 6/2004 |

OTHER PUBLICATIONS

T.Burnouf and M.Radosevich, J. Biochem. Biophys. Methods, 2001, 49, 575.
S.Subramanian, CRC Critical Rev. Biochem., 1984, 16, 169.
M. Allary, J. Saint-Blancard, E. Boschetti and P. Girot, Bioseparation, 1991, 2, 167.
E.Gianazza and P.Arnaud, Biochem. J., 1982, 201, 129.
C. Koch, L. Borg, K. Skjodt and G. Hoven, J. Chromatogr. B., 1998, 718, 41.
C.R. Lowe, A.R. Lowe and G. Gupta, J. Biochem. Biophys. Methods, 2001, 49, 561.
N. Lindner, R. Jeffcoat, C. Lowe, J. Chromatogr. 1989, 473, 227.
Y.D. Clonis, N.E. Labrou, V. Kotsira, C. Mazitsos, S. Melissis, G. Gogolas, J. Chromatogr. A, 2000, 891, 33.
N.E. Labrou, E. Eliopoulos, Y.D. Clonis, Biochem J., 1996, 315, 695.

* cited by examiner

*Primary Examiner* — Venkataraman Balasubramanian
(74) *Attorney, Agent, or Firm* — Qi Zhuo

(57) ABSTRACT

A process for the separation of biological materials, such as dye-ligand affinity chromatography, wherein an adsorbent is used, which comprises a reaction product of certain reactive anthroquinone compounds and a substrate having a group capable of reaction with a reactive group in said reactive anthroquinone compounds to form a covalent bond.

7 Claims, 2 Drawing Sheets

ADSORBENTS COMPRISING ANTHRAQUINONE DYE-LIGENDS FOR THE SEPARATION OF BIOLOGICAL MATERIALS

The present invention relates to a process for the separation or purification of biological materials using adsorbents, which comprise anthraquinone dye ligands, a process for the preparation of the adsorbents and the adsorbents.

Reactive dyes are well established products which are widely used in the textile industry for the coloration of cellulosic textiles, such as cotton or viscose. The molecule of such a reactive dye may be viewed as being made up of two interlinked units, each of which has a distinct function. One unit is the chromophore whose function is to impart the desired colour and other tinctorial properties to the textile. The other unit is the fibre reactive group which, under well established application conditions, reacts chemically with cellulose to covalently bind the dye molecules to the textile to produce a dyed material which is highly resistant to washing processes.

Whilst reactive dyes were initially developed to solve certain problems encountered in the dyeing and printing of cellulosic textile materials, they have, over the years, been found to possess properties, which make them of use outside the textile dyeing field.

It is known, for example, from U.S. Pat. Nos. 4,016,149 and 4,546,161, that these dyes can be attached by similar techniques to carbohydrate substrates, such as polymers and co-polymers derived from agarose, dextrose, dextrans, etc. Reaction products of such carbohydrate substrates and certain commercially available reactive dyes have been used in affinity chromatography as adsorbents for the chromatographic separation or purification of certain proteinaceous materials. Among the commercial textile dyes, which have been used as ligands for protein or enzyme separation, are certain blue anthraquinone dyes comprising a mono chloro triazine moiety, such as C.I. Reactive Blue 2 (Cibacron Blue 3GA), C.I. Reactive Blue 5 and C.I. Reactive Blue 49.

Affinity chromatography is based on the differential affinities of the proteins or enzymes for the ligands on the stationary phase of the adsorbent and is increasingly proving to be very crucial in high-end application areas like biopharmaceuticals and diagnostics as described, for example, in WO 2004052870. The nature of the interaction may be hydrogen-bonding, electrostatic forces, stacking as a result of favourable geometry or any other aspect that encourages the ligand-target relationship. The ligand-target interaction should be sufficiently strong to allow the removal of the other contaminant molecules from a mixture while keeping the ligand-target complex intact, i.e. the proteins that have affinity to the ligands bind to the matrix while the others with no affinity are washed out. The bound proteins can be selectively eluted under conditions of varying pH, ionic strength and buffers as described, for example, in P. D. G. Dean, W. S. Johnson and F. A. Middle (Ed), Affinity Chromatography: A Practical Approach, 1982. The protein mixture can be subjected to separation by shaking or passing over a column with the adsorbent.

Affinity chromatography has been found to be advantageous in blood fractionation for fine and rapid capture of proteins from plasma fractions. Affinity chromatography is applied to plasma fractions pre-purified by classical ethanol fractionation and/or by ion-exchange chromatography. Affinity chromatography is being used in the industrial production of various plasma products like concentrates of factor VIII, factor IX, von Willebrand factor, Protein C and Antithrombin III as known, for example, from T. Burnouf and M. Radosevich, J. Biochem. Biophys. Methods, 2001, 49, 575.

Cibacron Blue 3GA has been well studied for its interactions with various proteins and enzymes. It has been observed that the dye mimics the $NAD^+$ moiety and hence interacts with proteins and enzymes that recognize this site as described, for example, in S. Subramanian, CRC Critical Rev. Biochem., 1984, 16, 169. Albumin has been purified successfully by using immobilized Cibacron Blue 3GA on large scale as known, for example, from M. Allary, J. Saint-Blancard, E. Boschetti and P. Girot, Bioseparation, 1991, 2, 167. Fractionation of twenty-seven plasma proteins has been performed with the help of affinity chromatography using Cibacron Blue 3GA immobilized cross-linked agarose beads by a pH gradient as described, for example, in E. Gianazza and P. Arnaud, Biochem. J., 1982, 201, 129. Purification of serine proteases on Blue Sepharose (Cibacron Blue 3GA immobilized on agarose) has also been reported. It is known, for example, from C. Koch, L. Borg, K. Skjodt and G. Hoven, J. Chromatogr. B., 1998, 718, 41 that the interaction of serine proteases with Blue Sepharose involves the active site of the enzyme.

Advances in biotechnology like phage technology and computer aided design of artificial ligands have led to further developments in the application of affinity chromatography for protein purification as described, for example, in C. R. Lowe, A. R. Lowe and G. Gupta, J. Biochem. Biophys. Methods, 2001, 49, 561. Various tailor-made synthetic ligands, in addition to the traditionally used bio ligands like heparin, gelatin, protein A and protein C, have provided improved productivity of the plasma proteins.

The application of artificial ligand techniques for industrial protein purification has not been encouraged to a greater extent and has primarily been limited to the use of Cibacron Blue 3GA. Since the principle of affinity chromatography is based on the phenomenon of molecular recognition, structural variations of the ligand play a vital role in either stabilizing or destabilizing protein-dye interactions. See, for example, N. Lindner, R. Jeffcoat, C. Lowe, J. Chromatogr. 1989, 473, 227 and Y. D. Clonis, N. E. Labrou, V. Kotsira, C. Mazitsos, S. Melissis, G. Gogolas, J. Chromatogr. A, 2000, 891, 33. Secondary interactions within a ternary complex could also have profound effect in exhibiting affinity towards a specific protein as described, for example, in N. E. Labrou, E. Eliopoulos, Y. D. Clonis, Biochem J., 1996, 315, 695.

Accordingly, there is a need to provide readily synthesizable dye-ligand adsorbents to account for various separation or purification problems and to increase the scope of reliable methods for protein purification.

The present invention relates to a process for the separation of biological materials, wherein an adsorbent is used, which comprises a reaction product of a compound of formula

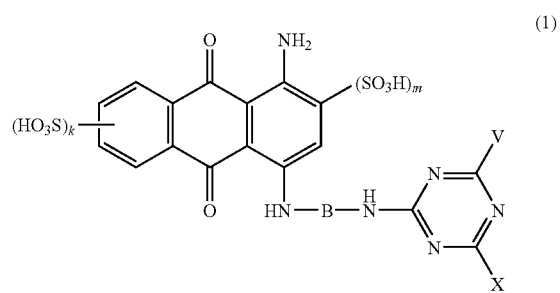

and a substrate having a group capable of reaction with a reactive group in said compound of formula (1) to form a covalent bond, in which B is $C_2$-$C_{12}$alkylene radical, which can be interrupted by 1, 2 or 3 members from the group consisting of —$NR_1$— or —O— and is unsubstituted or substituted by hydroxyl, sulfo, sulfato, cyano or carboxyl, $R_1$ is hydrogen or $C_1$-$C_4$alkyl, or B is a $C_5$-$C_9$cycloalkylene radical, $C_1$-$C_4$alkylene-$C_5$-$C_9$cycloalkylene radical or $C_1$-$C_4$alkylene-$C_5$-$C_9$cycloalkylene-$C_1$-$C_4$alkylene radical, which are unsubstituted or substituted by $C_1$-$C_4$alkyl, $C_1$-$C_4$alkoxy, sulfo, halogen or carboxyl, or a phenylene radical, $C_1$-$C_4$alkylene-phenylene radical or $C_1$-$C_4$alkylene-phenylene-$C_1$-$C_4$alkylene radical, which are unsubstituted or substituted by $C_1$-$C_4$alkyl, $C_1$-$C_4$alkoxy, $C_2$-$C_4$alkanoylamino, sulfo, halogen or carboxyl, V is a non-fibre-reactive substituent or is a fibre-reactive substituent of formula

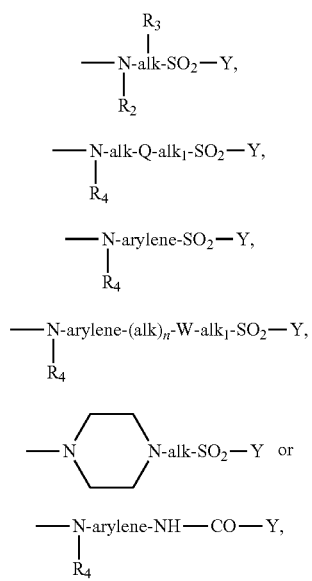

wherein $R_2$ is hydrogen or unsubstituted or substituted $C_1$-$C_4$alkyl or a radical

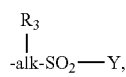

$R_3$ is hydrogen, hydroxy, sulfo, sulfato, carboxy, cyano, halogen, $C_1$-$C_4$alkoxycarbonyl, $C_1$-$C_4$-alkanoyloxy, carbamoyl or a group —$SO_2$—Y, $R_4$ is hydrogen or $C_1$-$C_4$alkyl, alk and $alk_1$ are each independently of the other linear or branched $C_1$-$C_6$alkylene, arylene is a phenylene or naphthylene radical which is unsubstituted or substituted by sulfo, carboxy, hydroxy, $C_1$-$C_4$alkyl, $C_1$-$C_4$alkoxy or by halogen, Y is vinyl or a radical —$CH_2$—$CH_2$-U and U is a leaving group, $Y_1$ is a group —CH(Hal)-$CH_2$(Hal) or —C(Hal)=$CH_2$ wherein Hal is chlorine or bromine, W is a group —$SO_2$—$NR_4$—, —$CONR_4$— or —$NR_4$CO— wherein $R_4$ is as defined above, Q is a radical —O— or —$NR_4$— wherein $R_4$ is as defined above, and n is a number 0 or 1, X is halogen, and k and m are each independently of the other a number 0 or 1 and the sum of k+m is 1 or 2, with the exception of an adsorbent, comprising a compound of formula

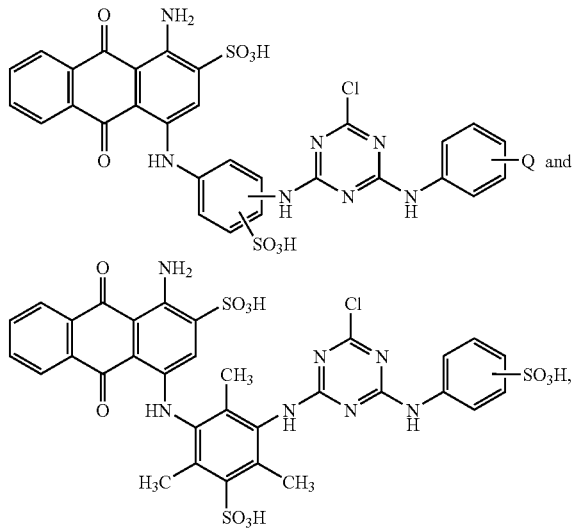

wherein
Q is sulfo or carboxy.

As $C_1$-$C_4$alkyl in the radical B there come into consideration, for example, methyl, ethyl, n-propyl, isopropyl, n-butyl, sec-butyl, tert-butyl or isobutyl, preferably methyl or ethyl, especially methyl.

As $C_1$-$C_4$alkoxy in the radical B there come into consideration, for example, methoxy, ethoxy, n-propoxy, isopropoxy, n-butoxy, sec-butoxy, tert-butoxy and isobutoxy, preferably methoxy or ethoxy, especially methoxy.

As halogen in the radical B there come into consideration, for example, fluorine, chlorine and bromine, preferably chlorine or bromine, especially chlorine.

As $C_2$-$C_4$alkanoylamino in the radical B there come into consideration, for example, acetylamino or propionylamino, preferably acetylamino.

Preferably $R_1$ is hydrogen or methyl.

An alkylene radical B is preferably a $C_2$-$C_6$alkylene radical, which can be interrupted by 1, 2 or 3 members —O— and is unsubstituted or substituted by hydroxyl or sulfato. The unsubstituted radicals, in particular the radical of the formula

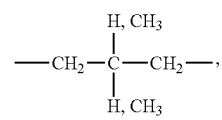

are preferred. The radicals of the formulae —$(CH_2)_3$— and —$CH_2$—$C(CH_3)_2$—$CH_2$— are of particular interest.

Preferred cycloalkylene-containing radicals B are the corresponding cyclohexylene-containing radicals, which, in particular, are unsubstituted or substituted by $C_1$-$C_4$alkyl. A cyclohexylene radical or methylene-cyclohexylene radical which is unsubstituted or substituted by $C_1$-$C_4$alkyl, in particular a methylene-cyclohexylene radical which is unsubstituted or substituted by $C_1$-$C_4$alkyl, is particularly preferred here.

Preferred phenylene-containing radicals B are the corresponding radicals which are unsubstituted or substituted by $C_1$-$C_4$alkyl, $C_1$-$C_4$alkoxy, halogen or sulfo. Phenylene or methylene-phenylene-methylene which are unsubstituted or substituted by $C_1$-$C_4$alkyl, $C_1$-$C_4$alkoxy, halogen or sulfo are particularly preferred. Especially preferred radicals are those of the formula

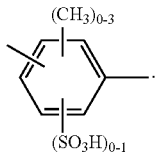

B is preferably a $C_2$-$C_6$alkylene radical, which can be interrupted by 1, 2 or 3 members —O— and is unsubstituted or substituted by hydroxyl or sulfato, or a cyclohexylene radical or methylene-cyclohexylene radical which is unsubstituted or substituted by $C_1$-$C_4$alkyl, or a phenylene or methylene-phenylene-methylene radical which is unsubstituted or substituted by $C_1$-$C_4$alkyl, $C_1$-$C_4$alkoxy, halogen or sulfo.

B is particularly preferably a $C_2$-$C_6$alkylene radical, a methylene-cyclohexylene radical which is unsubstituted or substituted by $C_1$-$C_4$alkyl, or a phenylene or methylene-phenylene-methylene radical which is unsubstituted or substituted by $C_1$-$C_4$alkyl, $C_1$-$C_4$alkoxy, halogen or sulfo.

B is especially preferably

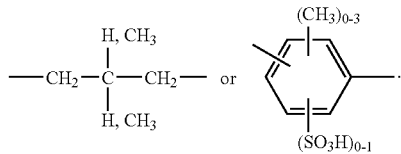

As $C_1$-$C_4$alkyl for $R_2$ and $R_4$, each independently of the others, there come into consideration, for example, methyl, ethyl, propyl, isopropyl, n-butyl, sec-butyl, tert-butyl and isobutyl, preferably methyl and ethyl, and especially methyl. The mentioned radical $R_2$ is unsubstituted or substituted, for example by halogen, hydroxy, cyano, $C_1$-$C_4$alkoxy, $C_1$-$C_4$alkoxycarbonyl, carboxy, sulfamoyl, sulfo or by sulfato, preferably by hydroxy, sulfo, sulfato, carboxy or by cyano. The unsubstituted radicals are preferred.

When Y is a radical —$CH_2$—$CH_2$-U, the leaving group U may be, for example, —Cl, —Br, —F, —$OSO_3H$, —$SSO_3H$, —OCO—$CH_3$, —$OPO_3H_2$, —OCO—$C_6H_5$, $OSO_2$—$C_1$-$C_4$alkyl or —$OSO_2$—$N(C_1$-$C_4$alkyl$)_2$. U is preferably a group of formula —Cl, —$OSO_3H$, —$SSO_3H$, —OCO—$CH_3$, —OCO—$C_6H_5$ or —$OPO_3H_2$, especially —Cl or —$OSO_3H$, and more especially —$OSO_3H$.

Y is preferably vinyl, β-chloroethyl, β-sulfatoethyl, β-thiosulfatoethyl, β-acetoxyethyl, β-phenoxyethyl or β-phosphatoethyl, especially β-chloroethyl, β-sulfatoethyl or vinyl, more especially β-sulfatoethyl or vinyl, and very especially vinyl.

Hal is preferably bromine.

alk and $alk_1$, each independently of the other, are, for example, methylene, 1,2-ethylene, 1,3-propylene, 1,4-butylene, 1,5-pentylene, 1,6-hexylene or a branched isomer thereof. alk and $alk_1$, each independently of the other, are preferably a $C_1$-$C_4$alkylene radical, and especially an ethylene or propylene radical.

Preferred meanings of arylene are a 1,3- or 1,4-phenylene radical which is unsubstituted or substituted by sulfo, methyl or by methoxy, and especially an unsubstituted 1,3- or 1,4-phenylene radical.

$R_2$ is preferably hydrogen, $C_1$-$C_4$alkyl or a radical of formula

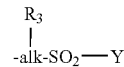

wherein $R_3$, Y and alk in each case are as defined above and have the preferred meanings given above. $R_2$ is especially hydrogen, methyl or ethyl, and very especially hydrogen.

$R_3$ is preferably hydrogen.

$R_4$ is preferably hydrogen, methyl or ethyl, and especially hydrogen.

The variable Q is preferably —NH— or —O—, and especially —O—.

W is preferably a group of formula —CONH— or —NHCO—, especially the group of formula —CONH—.

The variable n is preferably the number 0.

Preferred fibre-reactive substituents V of formulae (2a) to (2f) are those wherein $R_2$ and $R_3$ are each hydrogen, $R_4$ is hydrogen, methyl or ethyl, Q is a radical —NH— or —O—, W is the group —CONH—, alk and $alk_1$ are each independently of the other ethylene or propylene, arylene is phenylene which is unsubstituted or substituted by methyl, methoxy or by sulfo, Y is vinyl, β-chloroethyl or β-sulfatoethyl, especially vinyl or β-sulfatoethyl, and very especially vinyl, $Y_1$ is —CHBr—$CH_2$Br or —CBr=$CH_2$ and n is the number 0; amongst those substituents special preference is given to the radicals of formulae (2c) and (2d).

When V has the meaning of a fibre-reactive substituent, very special preference is given to V being a group of formula

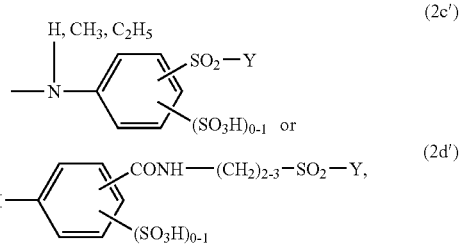

especially (2c'), wherein Y is as defined above and has the preferred meanings given above.

In the radical of formula (2c'), the nitrogen atom can be substituted by methyl or ethyl instead of hydrogen.

When V is a non-fibre-reactive substituent, it may be, for example, hydroxy; $C_1$-$C_4$alkoxy; $C_1$-$C_4$alkylthio which is unsubstituted or substituted by hydroxy, carboxy or by sulfo; amino; amino mono- or di-substituted by $C_1$-$C_8$alkyl, the alkyl being unsubstituted or further substituted by, for example, sulfo, sulfato, hydroxy, carboxy or by phenyl, especially by sulfo or by hydroxy, and being uninterrupted or interrupted by a radical —O—; cyclohexylamino which is unsubstituted or substituted by $C_1$-$C_4$alkyl; morpholino; N—$C_1$-$C_4$alkyl-N-phenylamino or phenylamino or naphthylamino, the phenyl or naphthyl being unsubstituted or substituted by, for example, $C_1$-$C_4$alkyl, $C_1$-$C_4$alkoxy, carboxy, sulfo or by halogen.

Examples of suitable non-fibre-reactive substituents V are amino, methylamino, ethylamino, β-hydroxyethylamino, 2-(β-hydroxyethoxy)ethylamino, N,N-di-β-hydroxyethylamino, p-sulfoethylamino, cyclohexylamino, morpholino, o-, m- or p-chlorophenylamino, o-, m- or p-methylphenylamino, o-, m- or p-methoxyphenylamino, o-, m- or p-sulfophenylamino, disulfophenylamino, o-carboxyphenylamino, 1- or 2-naphthylamino, 1-sulfo-2-naphthylamino, 4,8-disulfo-2-naphthylamino, N-ethyl-N-phenylamino, N-methyl-N-phenylamino, methoxy, ethoxy, n- or iso-propoxy and hydroxy.

As a non-fibre-reactive radical preference is given to V in the meaning of hydroxy; $C_1$-$C_4$alkoxy; $C_1$-$C_4$alkylthio which is unsubstituted or substituted by hydroxy, carboxy or by sulfo; amino; N-mono- or N,N-di-$C_1$-$C_4$alkylamino, which is unsubstituted or substituted in the alkyl moiety by hydroxy, sulfato or by sulfo and is uninterrupted or interrupted by a radical —O—; morpholino; phenylamino or N—$C_1$-$C_4$alkyl-N-phenylamino, wherein each phenyl ring is unsubstituted or substituted by sulfo, carboxy, chlorine, acetylamino, methyl or by methoxy and wherein the alkyl is unsubstituted or substituted by hydroxy, sulfo or by sulfato; or naphthylamino which is unsubstituted or substituted by from 1 to 3 sulfo groups.

Especially preferred as a non-fibre-reactive radical V corresponds to amino, N-mono- or N,N-di-$C_1$-$C_4$alkylamino which is unsubstituted or substituted in the alkyl moiety by hydroxy, sulfato or by sulfo and is uninterrupted or interrupted by a radical —O—, morpholino, phenylamino or N—$C_1$-$C_4$alkyl-N-phenylamino which is unsubstituted or substituted in the phenyl ring by sulfo, carboxy, chlorine, acetylamino, methyl or by methoxy, or naphthylamino which is unsubstituted or substituted by from 1 to 3 sulfo groups.

Especially important non-fibre-reactive radicals V are β-hydroxyethylamino, 2-(β-hydroxyethoxy)ethylamino, N,N-di-β-hydroxyethylamino, β-sulfoethylamino, morpholino, 2-, 3- or 4-sulfophenylamino, 1-sulfonaphth-2-yl-amino or 3,7-disulfonaphth-2-yl-amino.

k is preferably the number 0.

m is preferably the number 1.

X is, for example, fluorine, chlorine or bromine, preferably fluorine or chlorine, and especially chlorine.

In a preferred embodiment of the present invention the compound of formula (1) corresponds to a compound of formula

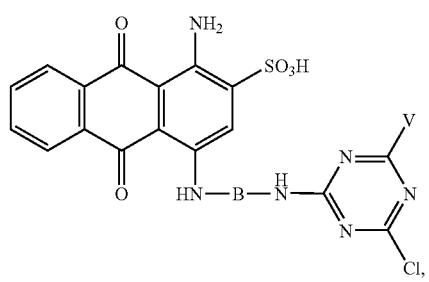

wherein

B is a $C_2$-$C_6$alkylene radical, a methylene-cyclohexylene radical, which is unsubstituted or substituted by $C_1$-$C_4$alkyl, or a phenylene or methylene-phenylene-methylene radical, which is unsubstituted or substituted by $C_1$-$C_4$alkyl, $C_1$-$C_4$alkoxy, halogen or sulfo, V is amino, N-mono- or N,N-di-$C_1$-$C_4$alkylamino which is unsubstituted or substituted in the alkyl moiety by hydroxy, sulfato or by sulfo and is uninterrupted or interrupted by a radical —O—, morpholino, phenylamino or N—$C_1$-$C_4$alkyl-N-phenylamino which is unsubstituted or substituted in the phenyl ring by sulfo, carboxy, chlorine, acetylamino, methyl or by methoxy, or naphthylamino which is unsubstituted or substituted by from 1 to 3 sulfo groups, or V is a group of formula (2c') or (2d') as defined above.

In a particularly preferred embodiment of the present invention the compound of formula (1) corresponds to a compound of formula (Ia) as given above, wherein B is a radical

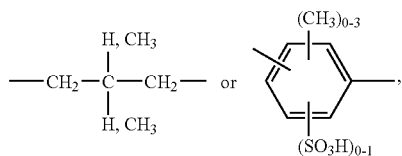

V corresponds to β-hydroxyethylamino, 2-(β-hydroxyethoxy)ethylamino, N,N-di-β-hydroxyethylamino, β-sulfoethylamino, morpholino, 2-, 3- or 4-sulfophenylamino, 1-sulfonaphth-2-yl-amino or 3,7-disulfonaphth-2-yl-amino, or V is a group of formula (2c') or (2d') as defined above.

A structural variation of the compound of formula (1) may account for particular separation or purification problems.

The substrate or matrix used to prepare the adsorbants applied in accordance with the present invention may be substantially water-insoluble. As examples of the said substrate there may be mentioned acrylic polymers, such as polyacrylamides or hydroxyalkylmethacrylates, and co-polymers of theses materials, metal oxides, such as zirconia, titania or alumina, silica or porous glass, but the preferred water-insoluble solid support is a polymeric substrate having a plurality of hydroxyl groups to which the compound of formula (1) may become attached through the reactive group. Especially suitable substrates are carbohydrates and modified carbohydrates. Examples of a suitable carbohydrate substrate are agarose, cross-linked agarose, dextrose, dextrans, and modified versions thereof, such as are available as "Sepharose" and "Sephadex" gels ("Sepharose" and "Sephadex" are trade marks of GE Healthcare) and are described in GB 1,540,165. Other polymeric substrates are polyamides. Especially preferred substrates are agarose and crosslinked agarose.

The adsorbents applied in accordance with the present invention may be prepared by standard techniques, for example, by reacting a compound of formula (1) with a substrate having a group capable of reaction with a reactive group in said compound of formula (1) to form a covalent bond, e.g. a carbohydrate substrate, in the presence of an acid binding agent, such as an alkali metal hydroxide or carbonate, e.g. sodium hydroxide or sodium carbonate, wherein the variables are defined and preferred as given above.

Methods for the preparation of such adsorbents and chromatographic columns containing them are well documented, for example, in U.S. Pat. No's. 4,016,149 and 4,546,161. Hereby, these documents will be incorporated by reference.

As already indicated, the substrate or matrix, for example, agarose, crosslinked agarose, dextrose or dextrans, may be further modified by introduction of spacers of varying length, advantageously, before covalently binding the compound of formula (1) to the spacers. Spacers may allow for an increased interaction of the dye-ligands with the proteinaceous material to be purified, due to an improved accessibility of the dye-ligands, thereby improving the selectivity and the efficiency of the adsorbents.

Introduction of spacers is carried out, for example, by treatment of the substrate with epichlorhydrin in the presence of an acid binding agent, such as an alkali metal hydroxide or carbonate, e.g. sodium hydroxide or sodium carbonate, and subsequently with a polyamine, under suitable temperatures of, for example 20 to 80° C., preferably 20 to 50° C.

Polyamine compounds suitable for the introduction of spacers may be selected from the group consisting of aromatic polyamines, aliphatic polyamines and alicyclic polyamines. Typical examples include polyvinyl amine, polyvinyl imine, 1,2-ethylenediamine, hydrazine, hydrazine-2-bis-(3-aminopropyl)-amine, 1,4-diaminocyclohexane, 3-amino-1-methylaminopropane, N-hydroxyethylethylenediamine, N-methyl-bis-(3-aminopropyl)-amine, tetraethylenediamine, 1,4-diaminobutane, 1,6-hexamethylenediamine, 1,8-diaminooctane, 1-aminoethyl-1,2-ethylenediamine, diethylenetriamine, tetraethylenepentamine, pentaethylenehexamine, phenylenediamine, toluoylenediamine, 2,4,6-triaminotoluene-trihydrochlorides, 1,3,6-triaminonaphthalene, isophoronediamine, xylylenediamine, hydrogenated xylylenediamine, 4,4'-di-diaminophenylmethane, hydrogenated 4,4'-diaminodiphenylmethane, and derivatives of these polyamine monomers.

Aliphatic and/or alicyclic polyamines are preferred. Especially preferred are aliphatic and/or alicyclic diamines. There may be mentioned in particular 1,4-diaminobutane, 1,6-hexamethylenediamine and 1,8-diaminooctane. The polyamines may be used individually or as mixtures of at least two polyamines.

The biological material may be any material that binds specifically to the compounds of formula (1) employed in the process of the present invention, for example peptides, polypeptides, proteins, nucleotides, polynucleotides, nucleic acids, steroids, lipids, hormones. Generally however, the biological or related substance will be an enzyme, protein or polypeptide, for example albumin, peptidases, phosphatases, kinases, such as glycerokinase, hexokinase or urokinase, nucleases, such as restriction endonucleases or ribonuclease, dehydrogenases, such as glyceraldehyde-3-phosphate dehydrogenase, lactate dehydrogenase, liver alcohol dehydrogenase or glucose-6-phosphate dehydrogenase, esterases, synthetases, DNA or RNA binding proteins and receptors.

The adsorbent comprising the compound of formula (1) bound to a solid support may be in the form of a column for chromatographic separation purposes or in the form of a membrane to allow separation to be carried out in a membrane separation format.

The separation or purification process according to the present invention may also be carried out by treating, e.g. shaking, the biological material in the presence of the adsorbent comprising the compound of formula (1) in an aqueous environment of suitable pH and ionic strength, separating the adsorbent, e.g. by filtration, and eluting the bound proteins from the adsorbent by suitable variation of pH and ionic strength.

Advantageously, the separation or purification process according to the present invention is carried out by affinity chromatography, which comprises:

(a) the contact phase, wherein a mixture containing the biological material is contacted with the adsorbent comprising the compound of formula (1) retained on a chromatographic column.
(b) the washing phase, wherein the non-binding species are removed from the adsorbent comprising the compound of formula (1) by passing a washing solution therethrough, and
(c) the elution phase, wherein an eluting solution is passed through the adsorbent comprising the compound of formula (1) to recover the desired biological material detained from the column.

By the careful choice of the binding material, washing solution and eluting solution a one-step purification of complex mixtures of the biological material can be achieved.

According to another aspect of the present invention there is provided an adsorbent comprising the adduct of a compound of formula (1) as defined above and a substrate having a group capable of reaction with a reactive group in said compound of formula (1) to form a covalent bond, wherein the variables are defined and preferred as given above.

The adsorbents according to the present invention are highly pure materials, devoid of any dye leaching behavior and contain various levels of dye-ligand concentrations on the matrix. Furthermore, the adsorbents according to the present invention are chemically and thermally stable and highly selective and provide various dye-ligand structures available for screening in dye-ligand affinity chromatography.

The range of dye structures available for screening is a significant advancement in dye-ligand affinity chromatography. Further, the interaction with these structural variants could involve the active site of a protein (T. Burnouf, H. Goubran, M. Radosevich, J. Chromatogr. B. 1998, 715, 65) or the interaction could be elsewhere on the protein (B. M. Hayden and P. C. Engel, Eur. J. Biochem., 2001, 268, 1173). A potential for both such modes of binding by the set of adsorbents makes them a valuable resource in developing protein purification protocols for almost any protein of interest.

Some of the dye-ligands used according to the present invention are new. Accordingly, the present invention relates also to the compounds of formulae

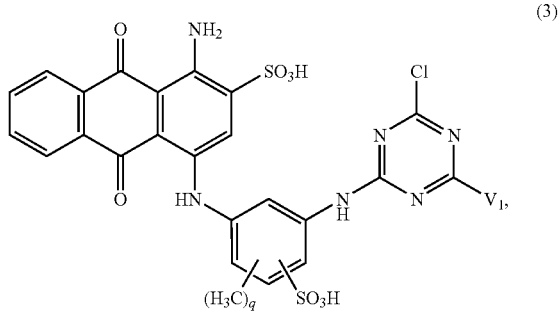

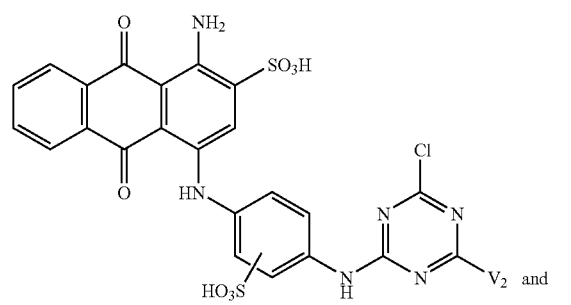

(5)
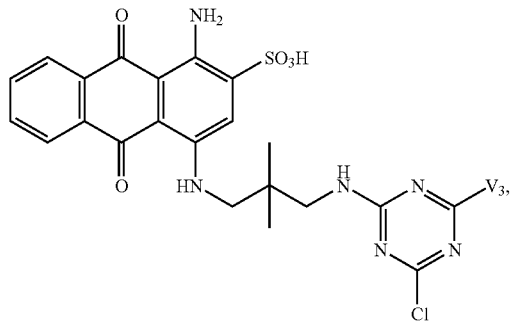
wherein
V₁ is β-hydroxyethylamino, 2-(β-hydroxyethoxy)ethylamino or morpholino,
V₂ and V₃ each independently of the other are β-hydroxyethylamino, 2-(β-hydroxyethoxy)ethylamino, N,N-di-β-hydroxyethylamino or morpholino, and
q is the number 0, 1, 2 or 3, preferably 0 or 3.
Preferred are the compounds of formulae
(3a)
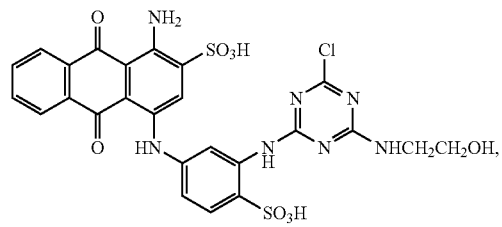
(3b)
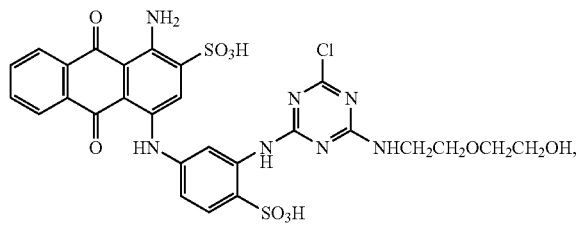
(3c)
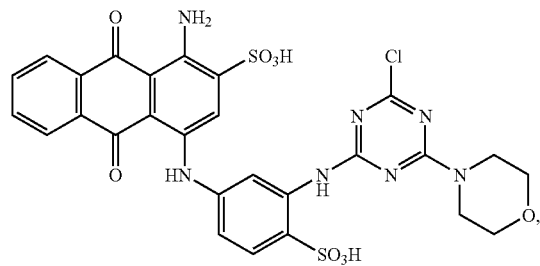
(3d)
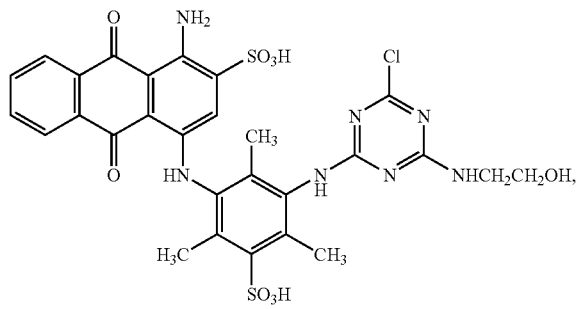
(3e)
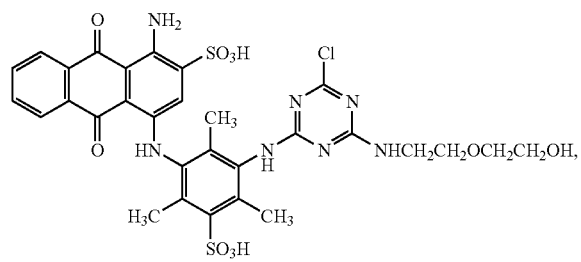
(3f)
(4a)
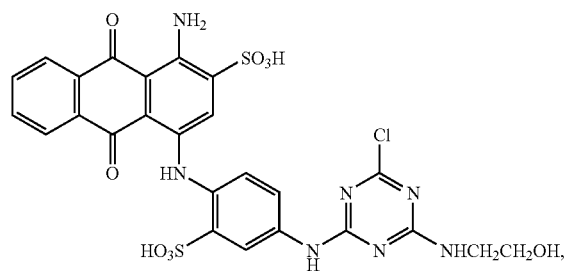
(4b)
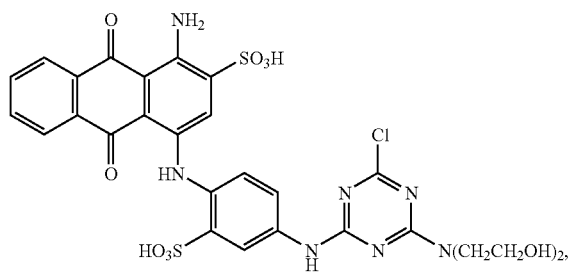

-continued
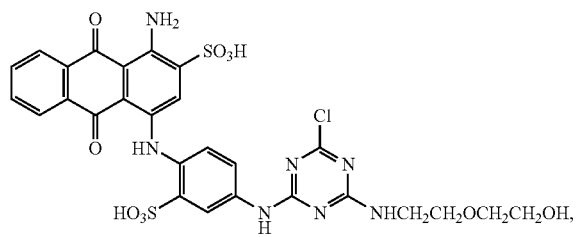
(4c)
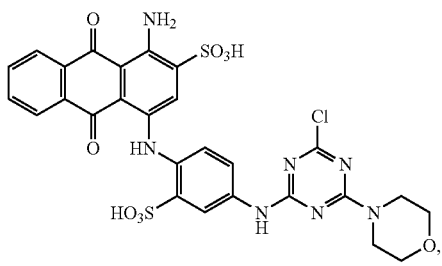
(4d)
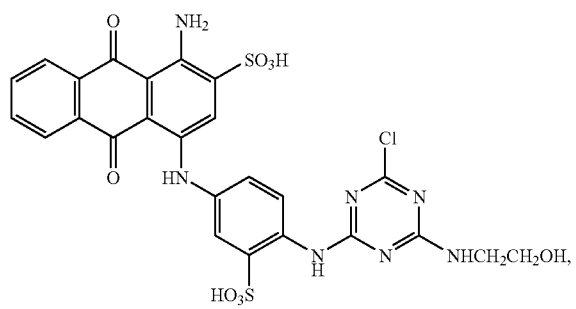
(4e)
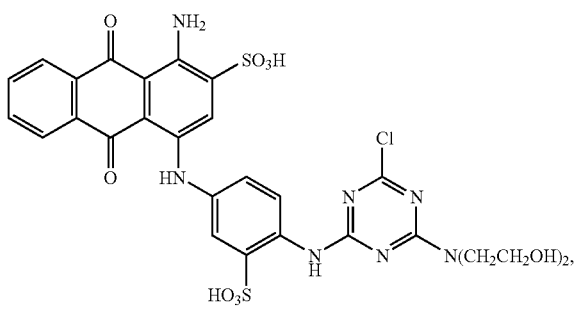
(4f)
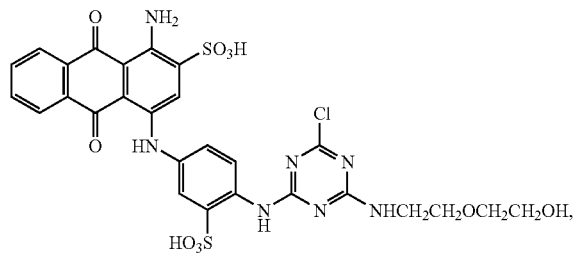
(4g)
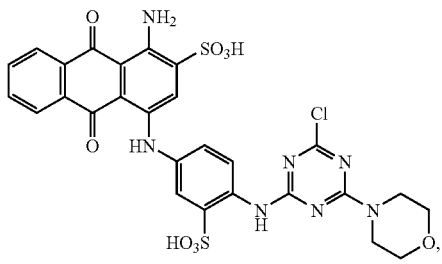
(4h)
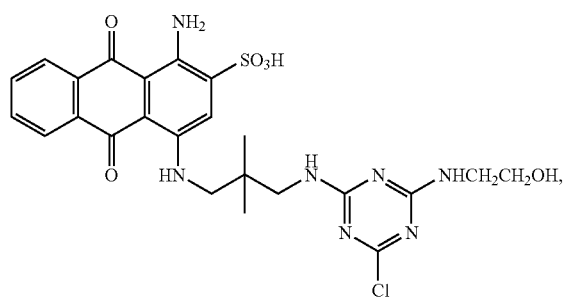
(5a)
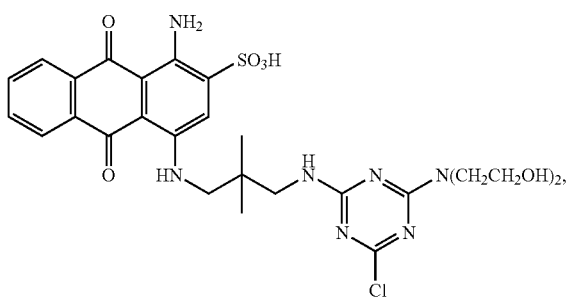
(5b)
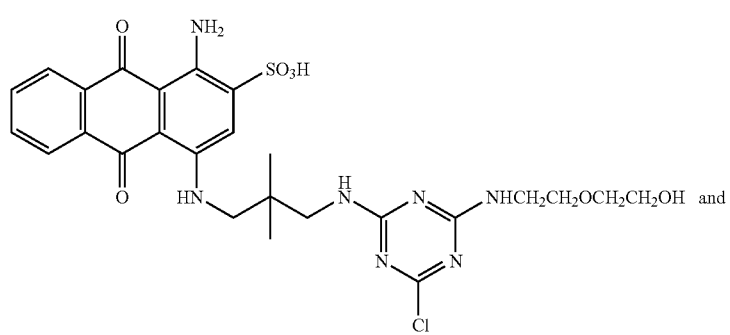
(5c)

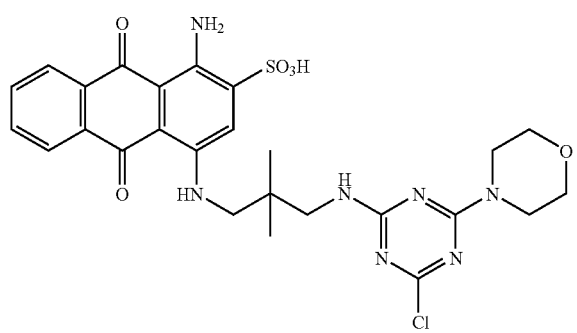

(5d)

The dye-ligands can be prepared analogously to procedures known in the art.

The following Examples serve to illustrate the invention. The temperatures are given in degrees Celsius. Unless otherwise indicated, parts are parts by weight and percentages relate to percent by weight. Parts by weight relate to parts by volume in a ratio of kilograms to liters.

Preparation of the Dye-ligands

EXAMPLE 1

(a) 20.17 parts of cyanuric chloride are dispersed in 100 parts of water and 100 parts of ice. 19.26 parts of 2-aminobenzene sulfonic acid are neutrally dissolved with sodium hydroxide in 70 parts of water. The neutral solution, thus obtained, is added to the above dispersion of cyanuric chloride all at once and the pH value is maintained at 3 for 1 hour by means of an aqueous sodium hydroxide solution (30%). Subsequently, the pH value is increased in steps up to 6 and maintained for a couple of hours by dropwise addition of an aqueous sodium hydroxide solution (30%). The temperature is held at 0-5° C. for a few hours.

(b) 40.35 parts of the compound, which in the form of the free acid corresponds to the formula

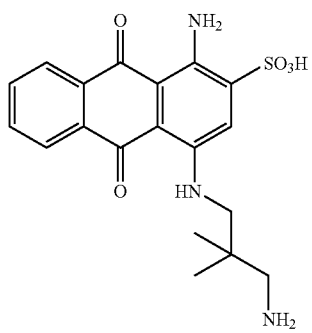

are dissolved in 200 parts of water and added all at once into the solution obtained according to step (a). The pH value is raised to 8.4-8.6 immediately by addition of an aqueous sodium hydroxide solution (30%) and the temperature is allowed to increase to 20° C. These conditions are maintained for a couple of hours. The reaction mixture is neutralized, freed of inorganic salts by dialysis and concentrated by evaporation. The product is dried and 94.3 g of a compound are collected, which in the form of the free acid corresponds to the formula

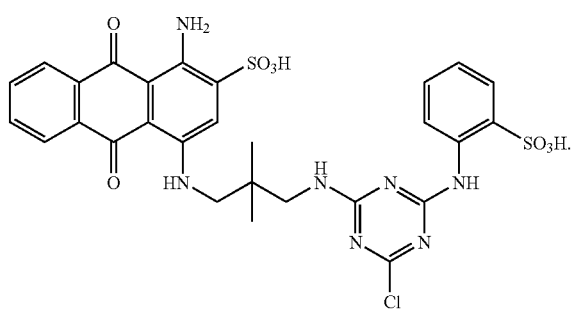

(101)

EXAMPLE 2

(a) 19.36 parts of cyanuric chloride are dispersed in 50 parts of water and 60 parts of ice. 48.95 parts of a compound, which in the form of the free acid corresponds to the formula

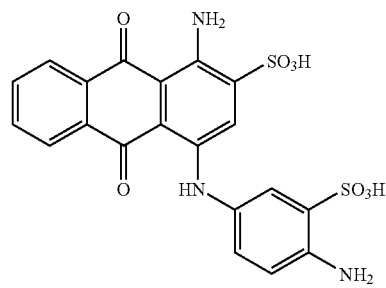

are neutrally dissolved with sodium hydroxide in 350 parts of water. The neutral solution, thus obtained, is added to the above dispersion of cyanuric chloride within 20 minutes while maintaining the pH value at 5 by dropwise addition of an aqueous sodium hydroxide solution (30%). The reaction mixture is kept at pH 6 and the temperature is maintained at 0-2° C. for a couple of hours.

(b) 9.58 parts of morpholine are added to the solution obtained according to step (a). The pH value is raised to 9 immediately by addition of an aqueous sodium hydroxide solution (30%) and the temperature is increased to 60° C. These conditions are maintained for a couple of hours. The reaction mixture is neutralized, freed of inorganic salts by dialysis and concentrated by evaporation. The product is dried and 93.1 g of a compound are collected, which in the form of the free acid corresponds to the formula

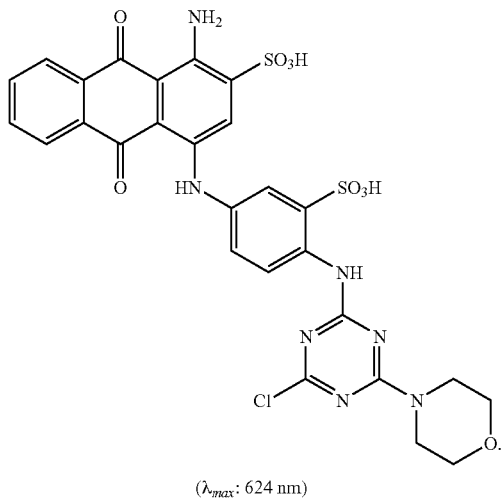

(λ$_{max}$: 624 nm)

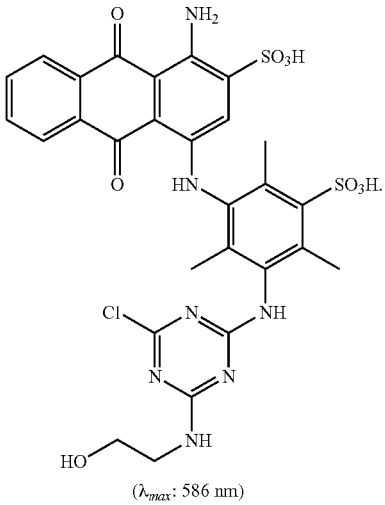

(λ$_{max}$: 586 nm)

EXAMPLE 3

(a) 12.9 parts of cyanuric chloride are dispersed in 50 parts of water and 50 parts of ice. 38.42 parts of a compound, which in the form of the free acid corresponds to the formula

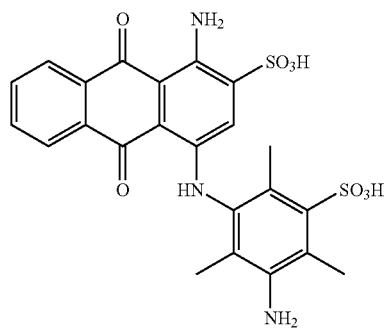

are neutrally dissolved with sodium hydroxide in 365 parts of water. The neutral solution, thus obtained, is added to the above dispersion of cyanuric chloride within 10 minutes while maintaining the pH value at 5 by dropwise addition of an aqueous sodium hydroxide solution (30%). The reaction mixture is kept at pH 5 and the temperature is maintained at 0° C. for a couple of hours.

(b) 4.70 parts of ethanol amine are added to the solution obtained according to step (a). The pH value is raised to 9 immediately by addition of an aqueous soda solution (20%) and the temperature is increased to 50° C. These conditions are maintained for a couple of hours.

(c) 35 parts of sodium chloride are added to 1750 parts of the reaction mixture. After 30 minutes, the suspension is filtered and dried. 44 parts of a compound are collected, which in the form of the free acid corresponds to the formula

EXAMPLE 4

(a) 19.36 parts of cyanuric chloride are dispersed in 50 parts of water and 60 parts of ice. 48.95 parts of a compound, which in the form of the free acid corresponds to the formula

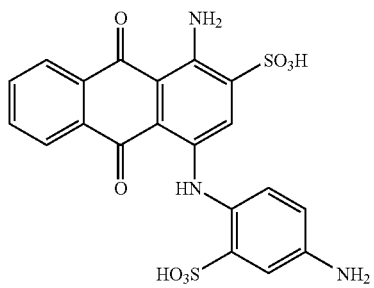

are neutrally dissolved with sodium hydroxide in 500 parts of water. The neutral solution, thus obtained, is added to the above dispersion of cyanuric chloride within 45 minutes while maintaining the pH value at 5 by dropwise addition of an aqueous sodium hydroxide solution (30%). The reaction mixture is kept at pH 5 and the temperature is maintained at 0° C. for a couple of hours.

(b) 6.72 parts of ethanol amine are added to the solution obtained according to step (a). The pH value is raised to 8.5 immediately by addition of an aqueous soda solution (20%) and the temperature is increased to 40° C. These conditions are maintained for a couple of hours.

(c) 150 parts of sodium chloride are added to 2000 parts of the reaction mixture. After 30 minutes, the suspension is filtered and dried. 88 parts of a compound are collected, which in the form of the free acid corresponds to the formula

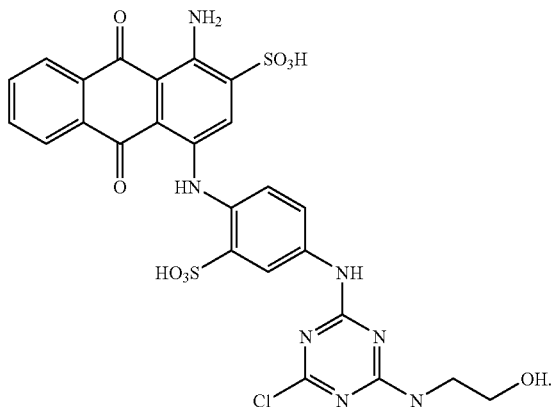

($\lambda_{max}$: 622 nm)

EXAMPLE 5

(a) 7.75 parts of cyanuric chloride are dispersed in 30 parts of water and 40 parts of ice. 19.58 parts of a compound, which in the form of the free acid corresponds to the formula

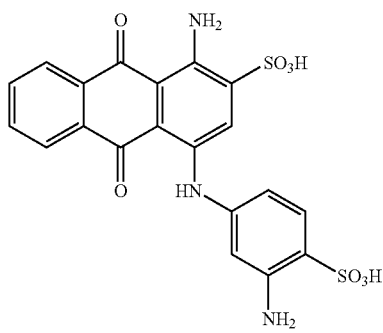

are neutrally dissolved with sodium hydroxide in 200 parts of water. The neutral solution, thus obtained, is added to the above dispersion of cyanuric chloride within 45 minutes while maintaining the pH value at 5 by dropwise addition of an aqueous sodium hydroxide solution (30%). The reaction mixture is kept at pH 5 and the temperature is maintained at 0° C. for a couple of hours.

(b) 13.61 parts of a compound, which in the form of the free acid corresponds to the formula

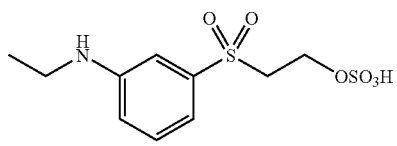

(104)

previously dissolved with an aqueous soda solution (20%) at pH 5 are added to the solution obtained according to step (a). The pH value is raised to 7 immediately by addition of an aqueous soda solution (20%) and the temperature is allowed to increase to 20° C. These conditions are maintained over night. The product is dried.

(c) 96.8 parts of the dried product obtained according to (b) are slurryed with 350 parts of a sodium chloride solution (5%). Subsequently, two portions of 17.5 parts of sodium chloride and two portions of 100 parts of acetone are added. The suspension is stirred for 30 minutes, filtered and dried. 76.56 parts of a compound are collected, which in the form of the free acid corresponds to the formula (105)

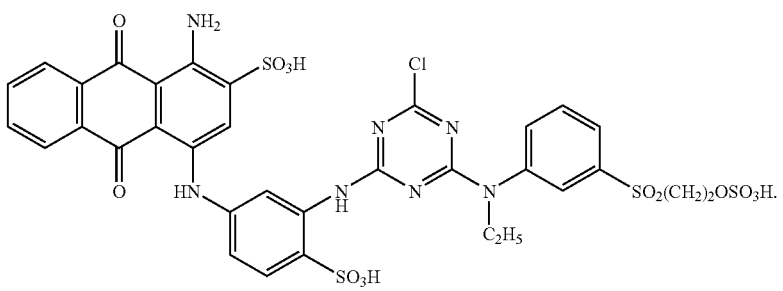

EXAMPLES 6 TO 25

In a manner analogous to that described in Examples 1 to 5 it is possible to obtain the dye-ligands of formulae (106)

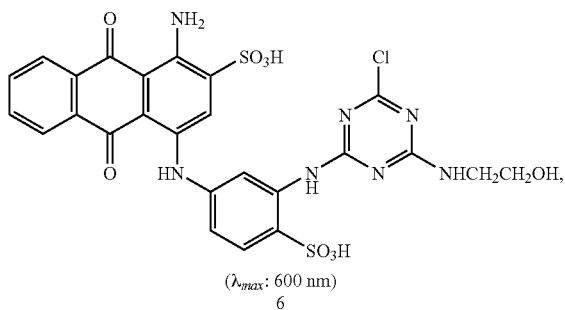

($\lambda_{max}$: 600 nm)
6

(107)

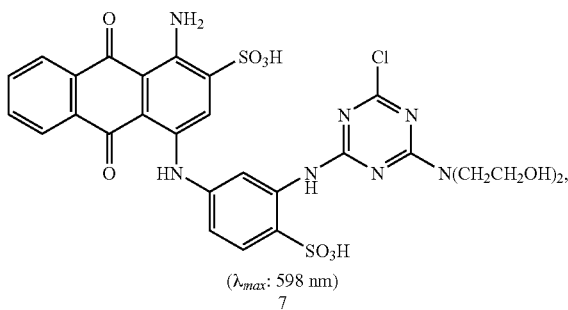

($\lambda_{max}$: 598 nm)
7

-continued
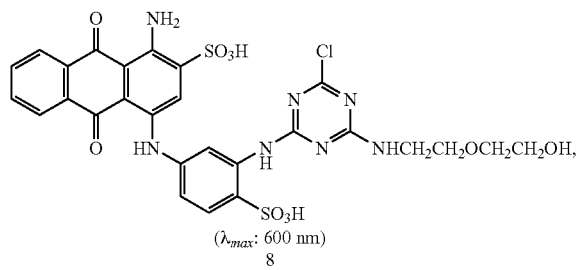
(λmax: 600 nm)
8
(108)
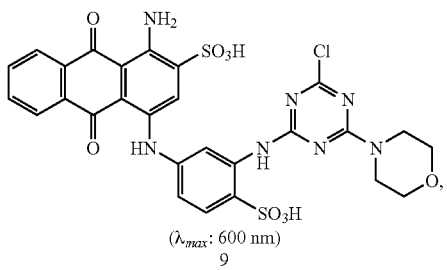
(λmax: 600 nm)
9
(109)
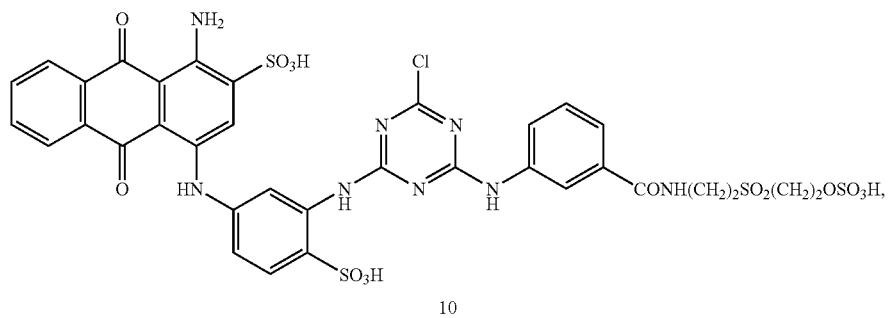
10
(110)
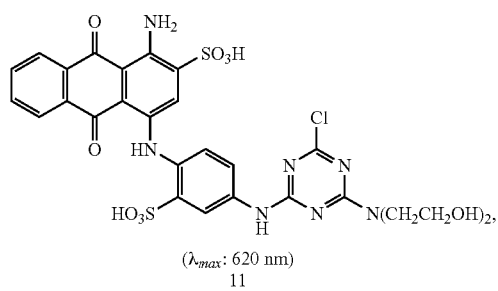
(λmax: 620 nm)
11
(111)
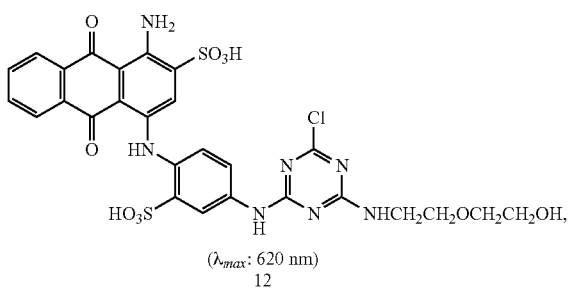
(λmax: 620 nm)
12
(112)
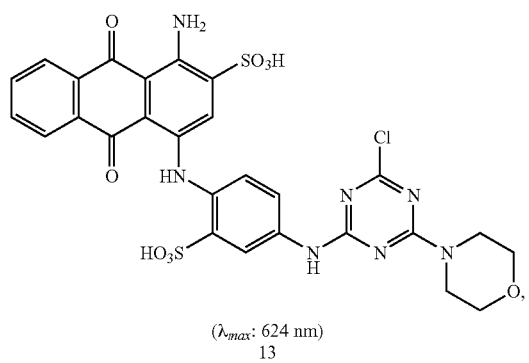
(λmax: 624 nm)
13
(113)
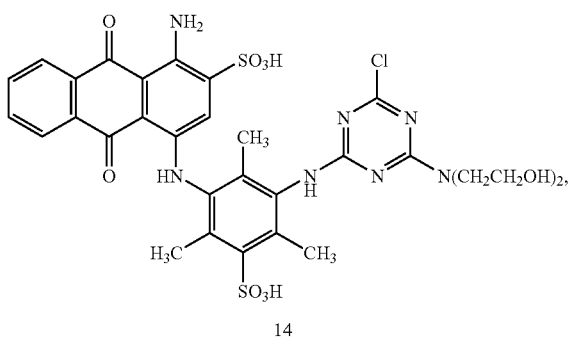
14
(114)
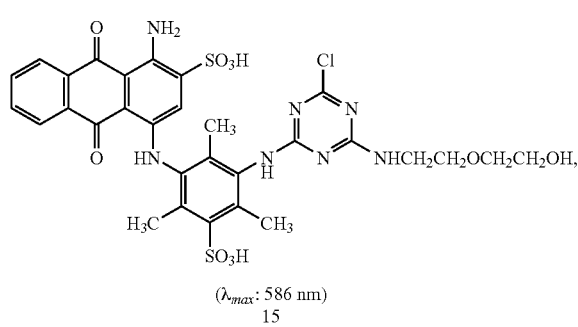
(λmax: 586 nm)
15
(115)
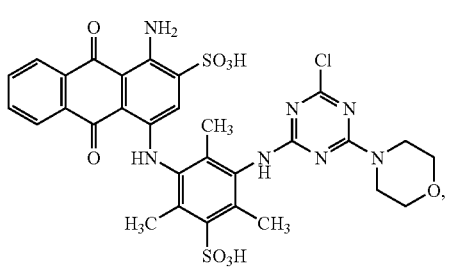
(λmax: 588 nm)
16
(116)

-continued
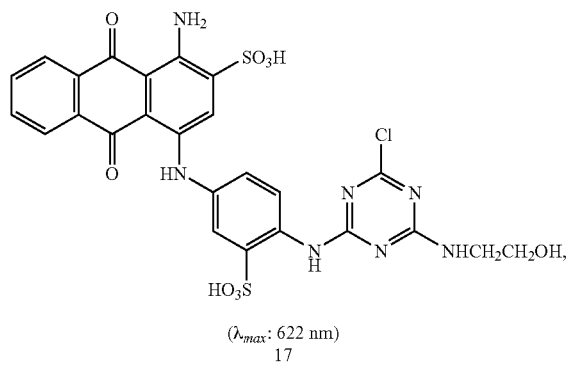
(λ_max: 622 nm)
17
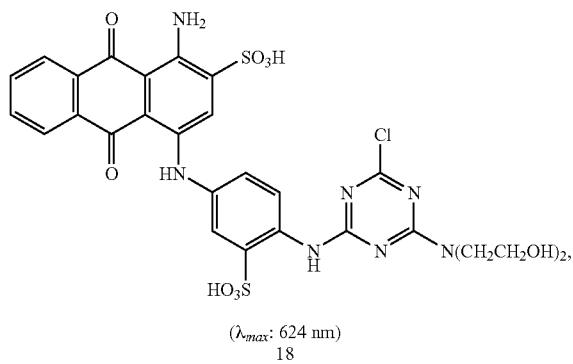
(λ_max: 624 nm)
18
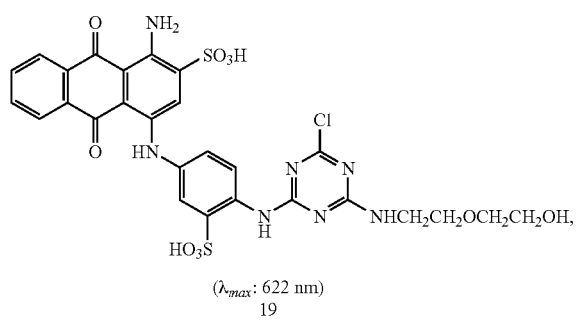
(λ_max: 622 nm)
19
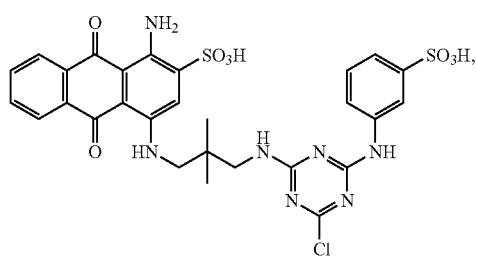
20
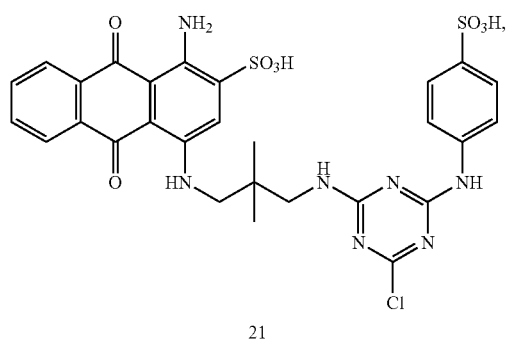
21
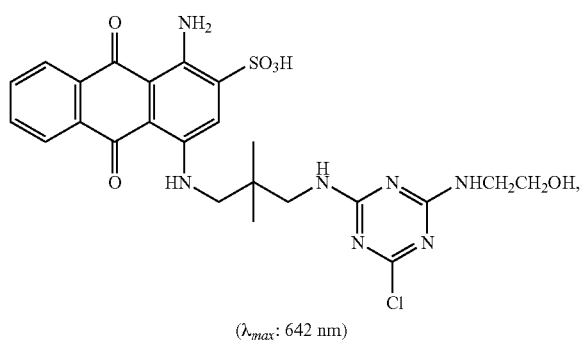
(λ_max: 642 nm)
22
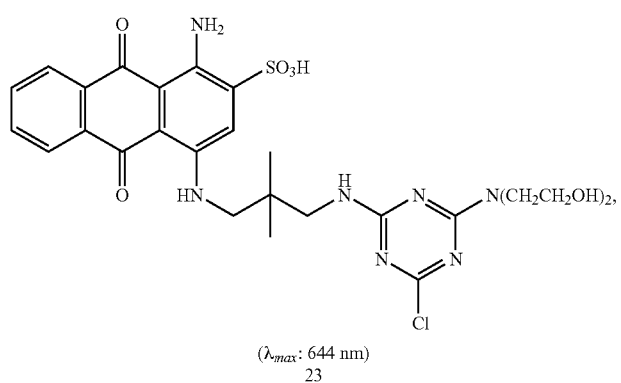
(λ_max: 644 nm)
23

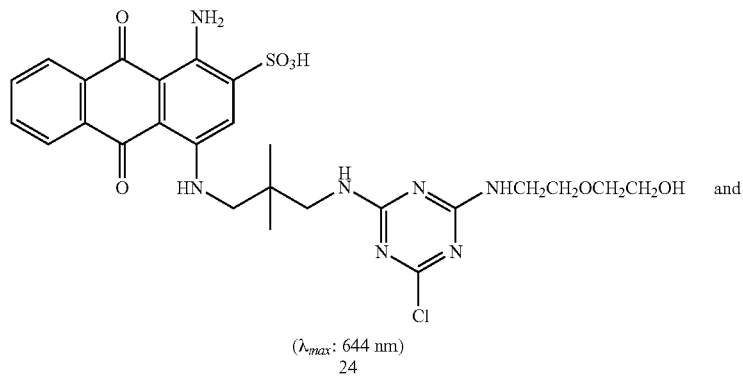

(λ_max: 644 nm)
24

(124)

and

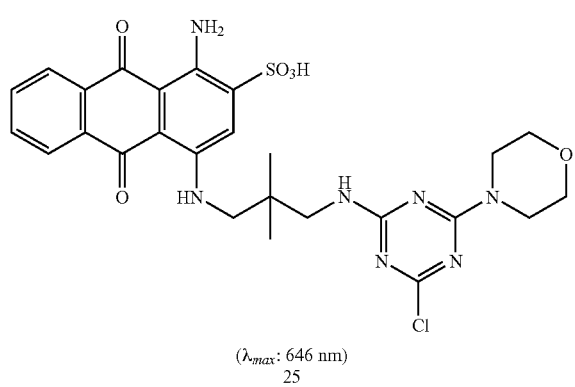

(λ_max: 646 nm)
25

(125)

Preparation of the Adsorbents

EXAMPLE 26

General Protocol for the Synthesis of Adsorbents via Direct Immobilization

Agarose gel (6% cross-linked [CL], 3 g) is washed with water (70 ml) and added to a solution of the dye-ligand (30-60 µmol) in water (3-9 ml). The mixture is shaken for 5 min and 220 g/l of sodium chloride solution (0.6 ml) are added. After a further 30 min of shaking, sodium carbonate (1.5 g) is added slowly to the above suspension and gently shaken at 180 rpm at 60° C. for 2-16 h. The mixture is allowed to cool, filtered, and solid is washed successively with water (300 ml), 1M aqueous sodium chloride (150 ml), 1:1 v/v DMSO-water (30 ml), 1M aqueous sodium chloride (150 ml), buffer solutions (90 ml) each of pH 3, pH 9 and water (300 ml). The drained adsorbent is stored in 20% v/v methanol at 4° C.

The dye ligand densities were calculated using difference analysis (unreacted dye in the filtrate) or gel analysis according to the following procedure.

The adsorbent (0.1 g, moist weight as filtered) is digested for 1 h at 40° C. in 6M HCl (25 ml) and the ligand densities of the adsorbents are estimated from the absorbance (at $\lambda_{max}$) of the HCl digest by means of standard solutions with a known amount of dye-ligand.

In some cases NaOH is used as a base instead of sodium carbonate and time is also altered.

The results are displayed in Table 1.

TABLE 1

| | | Direct immobilization | | | |
|---|---|---|---|---|---|
| Sample | Agarose | Dye of formula | Base | Time of treatment | Dye-ligand density [µmol/g] |
| BS-101 | 6% CL | (105) | $Na_2CO_3$ | 2 h | 7.9 |
| BS-102 | 4% CL | (105) | $Na_2CO_3$ | 2 h | 8.9 |
| BS-103 | 6% CL | (108) | $Na_2CO_3$ | 2 h | 4.3 |
| BS-104 | 6% CL | (201) | $Na_2CO_3$ | 2 h | 8.0 |
| BS-105 | 4% CL | (201) | $Na_2CO_3$ | 2 h | 12.7 |
| BS-106 | 6% CL | (110) | $Na_2CO_3$ | 2 h | 5.3 |
| BS-107 | 6% CL | (109) | $Na_2CO_3$ | 2 h | 7.6 |
| BS-201 | 6% CL | (104) | $Na_2CO_3$ | 4 h | 2.4 |
| BS-301 | 6% CL | (103) | $Na_2CO_3$ | 16 h | 8.1 |
| BS-302 | 6% CL | (115) | $Na_2CO_3$ | 2 h | 6.0 |
| BS-109 | 6% CL | (106) | NaOH | 4 h | 8.9 |
| BS-305 | 6% CL | (114) | NaOH | 4 h | 1.7 |
| BS-306 | 6% CL | (116) | NaOH | 16 h | 5.5 |
| BS-401 | 6% CL | (117) | $Na_2CO_3$ | 2 h | 5.7 |
| BS-402 | 6% CL | (119) | $Na_2CO_3$ | 2 h | 7.5 |
| BS-404 | 6% CL | (120) | $Na_2CO_3$ | 16 h | 5.0 |
| BS-203 | 6% CL | (111) | $Na_2CO_3$ | 4 h | 5.5 |
| BS-204 | 6% CL | (112) | $Na_2CO_3$ | 4 h | 6.2 |
| BS-205 | 6% CL | (113) | $Na_2CO_3$ | 16 h | 6.8 |
| BS-113 | 6% CL | (107) | $Na_2CO_3$ | 2 h | 4.5 |
| BS-501 | 6% CL | (101) | $Na_2CO_3$ | 4 h | 6.0 |
| BS-502 | 6% CL | (125) | NaOH | 4 h | 7.1 |
| BS-503 | 6% CL | (121) | $Na_2CO_3$ | 4 h | 4.9 |
| BS-504 | 6% CL | (122) | $Na_2CO_3$ | 4 h | 3.7 |
| BS-408 | 6% CL | (118) | $Na_2CO_3$ | 16 h | 6.2 |

EXAMPLE 27

Protocol for the Synthesis of an Adsorbent Via Direct Immobilization

Agarose gel (6% cross-linked, 3 g) is washed with water (70 ml) and added to a solution of a dye-ligand of formula

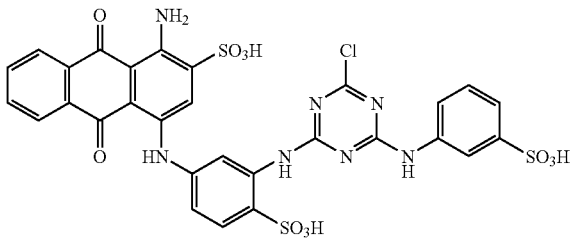

(201)

(0.0465 g, 60 μmol) in water (3 ml). The mixture is shaken for 5 min and 220 g/l of sodium chloride solution (0.6 ml) are added. After a further 30 min of shaking, sodium carbonate (1.5 g) is added slowly to the above suspension and gently shaken at 180 rpm at 60° C. for 2 h. The mixture is allowed to cool, filtered, and solid is washed successively with water (300 ml), 1M aqueous sodium chloride (150 ml), 1:1 v/v DMSO-water (30 ml), 1M aqueous sodium chloride (150 ml), buffer solutions (90 ml) each of pH 3, pH 9 and water (300 ml). The drained adsorbent is stored in 20% v/v methanol at 4° C.

The adsorbent (0.1 g, moist weight as filtered) is digested for 1 h at 40° C. in 6M HCl (25 ml) and the ligand density of the adsorbent is estimated from the absorbance (at $\lambda_{max}$) of the HCl digest as 8.0 μmol/g of drained gel.

Example 27 is for the purpose of illustration. The dye-ligand of formula (201) is excluded from the scope of generic formula (1) according to the present invention.

EXAMPLE 28

General Protocol for the Synthesis of Adsorbents Via Spacers

Agarose gel (6% cross-linked, 14 g) is washed with water (300 ml) and is immediately suspended in water (56 ml) in a suitable RB or conical flask. Epichlorohydrin (6.72 to 25.2 mmol) is added followed by equivalent quantity of NaOH (6.72 to 25.2 mmol) and the reaction mass is shaken at 150 rpm for 3 h at 27° C. The suspension is then filtered, washed thoroughly with water (850 ml) and drained to obtain epoxy-activated agarose.

The epoxy-activated agarose (13 g) is added to a solution of 1,6-diaminoalkane (6.24 to 9.36 mmol) in water (52 ml). The reaction mixture is shaken for 4 h at 27° C. or 45° C. and filtered. The resultant amino functionalized gel is thoroughly washed with water (750 ml) and drained.

The amino functionalized agarose (4 g) is suspended in a solution of dye-ligand (80 μmol) in water (16 ml) and the mixture is shaken at 150 rpm for 16 h hours at 27° C. The suspension is filtered and the excess of dye-ligand is washed off with water (250 ml), 1M NaCl (100 to 200 ml), 1:1 v/v DMSO-water (60 to 80 ml), 1M NaCl (100 to 200 ml) and finally water (250 ml). The drained adsorbent is stored in 20% v/v methanol at 4° C.

The dye ligand densities were calculated using difference analysis (unreacted dye in the filtrate) or gel analysis according to the following procedure.

The adsorbent (0.1 g, moist weight as filtered) is digested for 1 h at 40° C. in 6M HCl (25 ml) and the ligand densities of the adsorbents are estimated from the absorbance (at $\lambda_{max}$) of the HCl digest by means of standard solutions with a known amount of dye-ligand.

The results are displayed in Tables 2 and 3.

TABLE 2

Indirect immobilization via spacers

| Sample | Dye of formula | Epichlorhydrin [μmol/g] | Diaminohexane [μmol/g] | Dye-ligand density [μmol/g] |
|---|---|---|---|---|
| BS-111 | (201) | 480 | 480 | 2.6 |
| BS-112 | (110) | 480 | 480 | 7.7 |
| BS-114 | (106) | 480 | 480 | 3.0 |
| BS-115 | (107) | 480 | 480 | 2.4 |
| BS-116 | (108) | 480 | 480 | 4.1 |
| BS-118 | (109) | 480 | 480 | 6.7 |
| BS-308 | (114) | 480 | 480 | 3.9 |
| BS-309 | (115) | 480 | 480 | 4.7 |
| BS-310 | (116) | 480 | 480 | 3.6 |
| BS-409 | (117) | 480 | 480 | 4.5 |
| BS-410 | (118) | 480 | 480 | 4.3 |
| BS-411 | (119) | 480 | 480 | 4.3 |
| BS-412 | (120) | 480 | 480 | 4.5 |
| BS-505 | (101) | 480 | 480 | 3.6 |
| BS-506 | (121) | 480 | 480 | 3.9 |
| BS-507 | (122) | 480 | 480 | 2.9 |
| BS-211 | (104) | 720 | 720 | 4.5 |
| BS-212 | (111) | 720 | 720 | 3.4 |
| BS-213 | (112) | 720 | 720 | 5.1 |
| BS-214 | (113) | 720 | 720 | 5.1 |
| BS-314 | (103) | 720 | 720 | 10.0 |
| BS-508 | (125) | 720 | 720 | 5.5 |
| BS-124 | (105) | 1800 | 480 | 15.3 |
| BS-125 | (106) | 1800 | 480 | 16.2 |
| BS-126 | (107) | 1800 | 480 | 13.3 |
| BS-219 | (104) | 1800 | 480 | 8.6 |
| BS-220 | (111) | 1800 | 480 | 7.1 |
| BS-221 | (112) | 1800 | 480 | 8.8 |

6% cosslinked (CL) agarose was used as the support for all the adsorbents

TABLE 3

Indirect immobilization via spacers

| Sample | Dye of formula | Diaminoalkane | Dye-ligand density [μmol/g] |
|---|---|---|---|
| BS-151 | (106) | Diaminoethane | 4.4 |
| BS-152 | (107) | Diaminoethane | 3.7 |
| BS-153 | (109) | Diaminoethane | 5.2 |
| BS-335 | (116) | Diaminoethane | 5.1 |
| BS-433 | (118) | Diaminoethane | 3.4 |
| BS-434 | (120) | Diaminoethane | 1.7 |
| BS-522 | (122) | Diaminoethane | 2.9 |
| BS-245 | (111) | Diaminoethane | 1.7 |
| BS-246 | (112) | Diaminoethane | 2.7 |
| BS-334 | (103) | Diaminoethane | 6.3 |
| BS-521 | (125) | Diaminoethane | 6.1 |
| BS-148 | (106) | Diaminobutane | 7.7 |
| BS-149 | (107) | Diaminobutane | 6.5 |
| BS-150 | (109) | Diaminobutane | 9.6 |
| BS-333 | (116) | Diaminobutane | 9.5 |
| BS-431 | (118) | Diaminobutane | 8.4 |
| BS-432 | (120) | Diaminobutane | 10.0 |
| BS-520 | (122) | Diaminobutane | 6.5 |
| BS-242 | (111) | Diaminobutane | 2.8 |
| BS-243 | (112) | Diaminobutane | 4.4 |
| BS-332 | (103) | Diaminobutane | 10.3 |
| BS-519 | (125) | Diaminobutane | 4.5 |
| BS-145 | (106) | Diaminooctane | 11.3 |

TABLE 3-continued

Indirect immobilization via spacers

| Sample | Dye of formula | Diaminoalkane | Dye-ligand density [μmol/g] |
|---|---|---|---|
| BS-146 | (107) | Diaminooctane | 10.1 |
| BS-147 | (109) | Diaminooctane | 14.8 |
| BS-331 | (116) | Diaminooctane | 14.3 |
| BS-429 | (118) | Diaminooctane | 12.5 |
| BS-430 | (120) | Diaminooctane | 16.0 |
| BS-518 | (122) | Diaminooctane | 11.6 |
| BS-239 | (111) | Diaminooctane | 5.5 |
| BS-240 | (112) | Diaminooctane | 8.4 |
| BS-330 | (103) | Diaminooctane | 12.5 |
| BS-517 | (125) | Diaminooctane | 11.6 |

EXAMPLE 29

Protocol for the Synthesis of an Adsorbent Via Spacers

Agarose gel (6% cross-linked, 14 g) is washed with water (300 ml) and is immediately suspended in water (56 ml) in a 100 ml RB flask. Epichlorohydrin (0.6216 g, 6.72 mmol) is added followed by NaOH (0.268 g, 6.72 mmol) and the reaction mixture is shaken at 150 rpm for 3 h at 27° C. The suspension is then filtered, washed thoroughly with water (850 ml) and drained to obtain epoxy-activated agarose.

The epoxy-activated agarose (13 g) is added to a solution of 1,6-diaminohexane (0.7612 g, 6.56 mmol) in water (52 ml). The reaction mixture is shaken for 4 h at 27° C. and filtered. The resultant amino functionalized gel is thoroughly washed with water (750 ml) and drained.

The amino functionalized agarose (4 g) is suspended in a solution of the dye-ligand of formula (106) (0.0537 g, 81.1 μmol) in water (16 ml) and the reaction mixture is shaken at 150 rpm for 16 h at 27° C. The reaction mixture is filtered and the excess of dye-ligand is washed off with water (250 ml), 1M NaCl (100 ml), 1:1 v/v DMSO-water (60 ml), 1M NaCl (100 ml) and finally water (250 ml). The drained adsorbent is stored in 20% v/v methanol at 4° C.

The adsorbent (0.1 g, moist weight as filtered) is digested for 1 h at 40° C. in 6M HCl (25 ml) and the ligand density of the adsorbent is estimated from the absorbance (at $\lambda_{max}$) of the HCl digest as 3.0 μmol/g of drained gel.

Purification of Biological Materials:

Testing of the adsorbents to determine their effectiveness in protein purification is done mainly with two classes of enzymes. Representative oxidoreductase and hydrolase class of enzymes are used to evaluate the efficacy of the adsorbents. These protein examples included—laccase, NADP-glutamate dehydrogenase (NADP-GDH) (S. Noor and N. S. Punekar, Microbiology, 2005, 151, 1409), arginase and trypsin. But for trypsin all other enzymes are of fungal origin.

The screening of all the adsorbents is performed in a batch-binding and elution mode. The adsorbents with their structural diversity are selective and clearly discriminate between different proteins tested. For example, under a set of equilibration conditions, NADP-GDH is bound selectively to BS-212 and BS-213. One of these can be used in a scaled up purification. This NADP-GDH however does not bind the extensively used triazine dye Cibacron Blue 3GA (S. Subramanian, CRC Critical Rev. Biochem., 1984, 16, 169).

TABLE 4

Direct immobilization: Test results for selected adsorbents

| | Enzyme Activity bound/eluted (of percent loaded) | |
|---|---|---|
| Sample | Laccase | NADP-GDH |
| BS-101 | 33 | 27 |
| BS-103 | 42 | 07 |
| BS-104 | 00 | 11 |
| BS-106 | 42 | 05 |
| BS-107 | 17 | 29 |
| BS-113 | 09 | 21 |
| BS-201 | 18 | 06 |
| BS-203 | 09 | 00 |
| BS-204 | 18 | 00 |
| BS-205 | 00 | 26 |
| BS-301 | 08 | 08 |
| BS-302 | 24 | 06 |
| BS-305 | 31 | 00 |
| BS-306 | 00 | 04 |
| BS-401 | 16 | 00 |
| BS-402 | 24 | 00 |
| BS-403 | 16 | 11 |
| BS-404 | 31 | 00 |
| BS-408 | 42 | 00 |
| BS-501 | 37 | 09 |
| BS-502 | 00 | 00 |
| BS-503 | 23 | 06 |
| BS-504 | 44 | 00 |

TABLE 5

Indirect immobilization (ECH-DAH spacer): Test Results for selected adsorbents

| | Enzyme Activity bound/eluted (of percent loaded) | |
|---|---|---|
| Sample | Laccase | NADP-GDH |
| BS-111 | 50 | 21 |
| BS-112 | 25 | 20 |
| BS-114 | 59 | 23 |
| BS-115 | 75 | 17 |
| BS-116 | 76 | 19 |
| BS-118 | 85 | 05 |
| BS-211 | 82 | 70 |
| BS-212 | 90 | 77 |
| BS-213 | 96 | 57 |
| BS-214 | 96 | 59 |
| BS-308 | 78 | 10 |
| BS-309 | 80 | 07 |
| BS-310 | 83 | 07 |
| BS-314 | 92 | 14 |
| BS-409 | 69 | 12 |
| BS-410 | 81 | 14 |
| BS-411 | 83 | 00 |
| BS-412 | 69 | 25 |
| BS-505 | 82 | 00 |
| BS-506 | 83 | 00 |
| BS-507 | 85 | 00 |
| BS-508 | 78 | 57 |

TABLE 6

Indirect immobilization (ECH-DAE, ECH-DAB, ECH-DAO spacers): Test Results

| | Enzyme Activity bound/eluted (of percent loaded) | |
|---|---|---|
| Sample | Laccase | Arginase |
| BS-151 | 34 | 47 |
| BS-152 | 36 | 46 |
| BS-153 | 21 | 37 |

TABLE 6-continued

Indirect immobilization (ECH-DAE, ECH-DAB, ECH-DAO spacers): Test Results

| Sample | Enzyme Activity bound/eluted (of percent loaded) | |
|---|---|---|
| | Laccase | Arginase |
| BS-335 | 30 | 64 |
| BS-433 | 30 | 72 |
| BS-434 | 25 | 71 |
| BS-522 | 36 | 55 |
| BS-245 | 23 | 44 |
| BS-246 | 13 | 72 |
| BS-334 | 23 | 65 |
| BS-521 | 36 | 42 |
| BS-148 | 74 | 40 |
| BS-149 | 83 | 42 |
| BS-150 | 71 | 38 |
| BS-333 | 41 | 55 |
| BS-431 | 39 | 64 |
| BS-432 | 42 | 67 |
| BS-520 | 57 | 51 |
| BS-242 | 56 | 54 |
| BS-243 | 42 | 62 |
| BS-332 | 48 | 56 |
| BS-519 | 51 | 44 |
| BS-145 | 77 | 35 |
| BS-146 | 94 | 43 |
| BS-147 | 69 | 32 |
| BS-331 | 42 | 56 |
| BS-429 | 53 | 63 |
| BS-430 | 45 | 69 |
| BS-518 | 54 | 50 |
| BS-239 | 60 | 48 |
| BS-240 | 64 | 64 |
| BS-330 | 40 | 55 |
| BS-517 | 52 | 39 |

EXAMPLE 30

General Procedure

*Aspergillus terreus* NADP-glutamate Dehydrogenase

The fungus is grown on minimal medium (with nitrate as the nitrogen source) to mid log phase and the mycelia collected by filtration. The crude NADP-GDH extract from these cells is prepared in extraction buffer (100 mM phosphate, 1 mM PMSF, 1 mM EDTA, 4 mM 2-mercaptoethanol) at pH 7.5. The 30-70% ammonium sulfate fraction is desalted on G-25 matrix and used for assays. The activity is monitored by the continuous oxidation of NADPH at 340 nm. One unit of activity (U) is defined as one μmol of NADPH oxidized per minute in a 1 ml standard assay. In all the binding studies about 100 mU of NADP-GDH sample is applied on to the affinity resins.

Microfuge tube batch-mode: adsorbent (0.3 ml, packed volume) is equilibrated with chromatography buffer (20 mM phosphate, 1 mM EDTA, 4 mM 2-mercaptoethanol) at pH 7.5, in a 1.5 ml Eppendorf tube. Crude NADP-GDH sample (~100 mU in about 100 μl) is applied on to this matrix and incubated on ice for 15 min. The unbound fraction is collected as supernatant by centrifugation (1000 rpm for 2 min). The matrix is washed twice with 0.5 ml of the same buffer. Bound proteins are eluted twice (0.4 ml each time) by centrifugation, using first 0.3 M KCl and later with 0.5 M KCl, in the same buffer. All incubations are performed with an incubation time of 10 min and all operations in a cooling microfuge. The adsorbents show distinct binding/elution patterns with respect to the three enzyme activities tested. They do provide a range of affinity in being able to discriminate different proteins by differential binding.

EXAMPLE 31

General Procedure (*Aspergillus niger* Laccase)

Crude laccase protein is isolated from conidiating *A. niger* mycelia in 20 mM phosphate buffer. The 30-80% ammonium sulfate fraction is desalted on G-25 matrix and used for assays. The activity is monitored by the continuous oxidation of ABTS at 436 nm. One unit of activity (U) is defined as one μmol of ABTS oxidized per minute in a 1 ml standard assay. In all the binding studies about 5 mU of laccase sample is applied on to the affinity resins.

(a) Micro-spin column mode: Affinity resin (0.25 ml, packed volume) is equilibrated with 20 mM phosphate buffer (pH 7.0) in a micro spin-column. Crude laccase sample (~5 mU in about 100 μl) is applied on to this matrix and incubated on ice for 15 min. The unbound fraction is collected by centrifugation (1000 rpm for 2 min). The matrix is further washed with 0.3 ml of phosphate buffer. Bound proteins are eluted twice (0.3 ml each time) by centrifugation, using 0.6 M KCl in the same buffer.

(b) Microfuge tube batch-mode: adsorbent (0.3 ml, packed volume) is equilibrated with 20 mM phosphate buffer (pH 7.0) in a 1.5 ml Eppendorf tube. Crude laccase sample (~5 mU in about 100 μl) is applied on to this matrix and incubated on ice for 15 min. The unbound fraction is collected as supernatant by centrifugation (1000 rpm for 2 min). The matrix is washed twice with 0.5 ml of phosphate buffer. Bound proteins are eluted twice (0.4 ml each time) by centrifugation, using 0.6 M KCl in the same buffer. All incubations are performed with an incubation time of 10 min and all operations in a cooling microfuge.

EXAMPLE 32

General Procedure (*Aspergillus niger* Arginase)

The fungus is grown on minimal medium (with arginine as the sole nitrogen source) to mid log phase and the mycelia collected by filtration. The crude arginase extract from these cells is prepared in extraction buffer (200 mM imidazole HCl, 1 mM PMSF, 12 mM MnSO$_4$, 2 mM 2-mercaptoethanol) at pH 7.5. The enzyme is enriched on a DEAE column and the active fractions are pooled, brought to 70% ammonium sulfate to precipitate the enzyme activity. This pellet is dissolved in a buffer (25 mM Hepes-NaOH, 1.2 mM MnSO$_4$, 2 mM 2-mercaptoethanol, 20% glycerol) at pH 7.5. This sample is diluted in buffer (25 mM imidazole HCl, 1.2 mM MnSO$_4$, 2 mM 2-mercaptoethanol) at pH 7.5 and used for assays. The activity is monitored by the Archibald method for estimation of urea (at 478 nm). One unit of activity (U) is defined as one μmol of urea formed per minute in a standard assay. In all the binding studies about 300 mU of arginase sample is applied on to the affinity resins.

Microfuge tube batch-mode: adsorbent (0.3 ml, packed volume) is equilibrated with chromatography buffer (25 mM imidazole HCl, 1.2 mM MnSO$_4$, 2 mM 2-mercaptoethanol) at pH 7.5, in a 1.5 ml Eppendorf tube. Crude arginase sample (~300 mU in about 100 μl) is applied on to this matrix and incubated on ice for 15 min. The unbound fraction is collected as supernatant by centrifugation (1000 rpm for 2 min). The matrix is washed twice with 0.5 ml of the same buffer. Bound proteins are eluted twice (0.4 ml each time) by centrifugation, using 0.5 M KCl in the same buffer. All incubations are performed with an incubation time of 10 min and all operations in a cooling microfuge.

EXAMPLE 33

Purification of NADP-GDH (*A. terreus*) using BS-212 Adsorbent

The fungus is grown on minimal medium (with nitrate as the nitrogen source) to mid log phase and the mycelia collected by filtration. The crude NADP-GDH extract from these cells is prepared in extraction buffer A (100 mM phosphate, 1 mM PMSF, 1 mM EDTA, and 4 mM 2-mercaptoethanol) at pH 7.5. The 30-70% ammonium sulfate fraction is desalted on G-25 matrix (bed volume of 20 ml) equilibrated with 20 mM phosphate buffer (pH 7.5) having 1 mM EDTA and 4 mM 2-mercaptoethanol (buffer B). This desalted protein is loaded on to a 20 ml BS-212 column at a flow rate of 10 ml/hr. The column is washed with 100 ml of buffer B at flow rate of 12 ml/hr.

Bound proteins are eluted using a linear gradient of 0-0.3 M of KCl (20 ml+20 ml) in buffer B. For elution, a flow rate of 18 ml/hr is maintained and fractions (1.5 ml each) are collected. NADP-GDH activity is measured by following the change in absorbance at 340 nm as mentioned before. The reductive amination assay performed in a reaction volume of 1.0 ml contained—100 mM Tris-HCl at pH 8.0, 10 mM $NH_4Cl$, 10 mM 2-oxoglutarate and 0.1 mM NADPH.

Results: Of the ten units of NADP-GDH activity loaded none was recovered in the unbound or the wash fractions. Most of the activity was bound and could be eluted (9.5 units) using the KCl gradient mentioned above. The profile of this elution is shown in FIG. 1. The purification achieved by this single step using the adsorbent was monitored by native PAGE of the sample loaded and the peak fraction. FIG. 2 gives the picture of this gel. Clearly the BS-212 adsorbent was able to substantially enrich the *Aspergillus* NADP-GDH protein (Shown by the arrow in FIG. 2).

Elution profile of *A. terreus* NADP-GDH from BS-212 column using KCl gradient

FIG. 2

Figure 1:
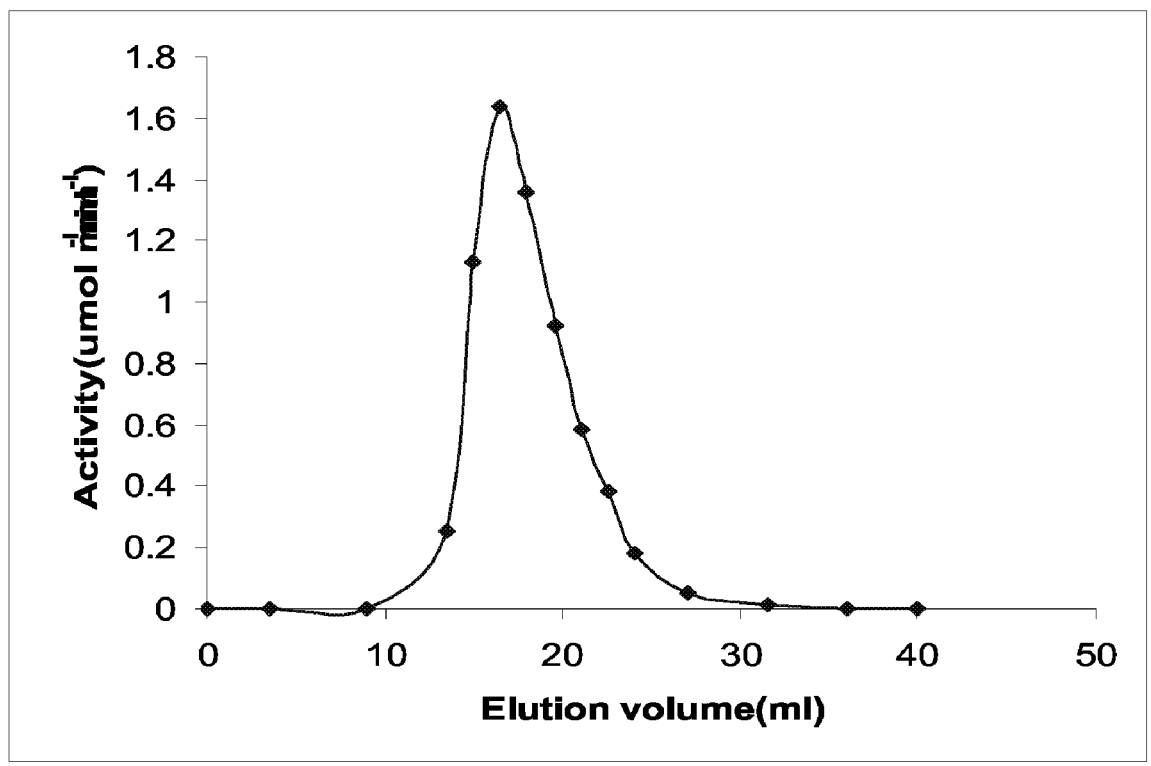
FIG. 1
Figure 2:
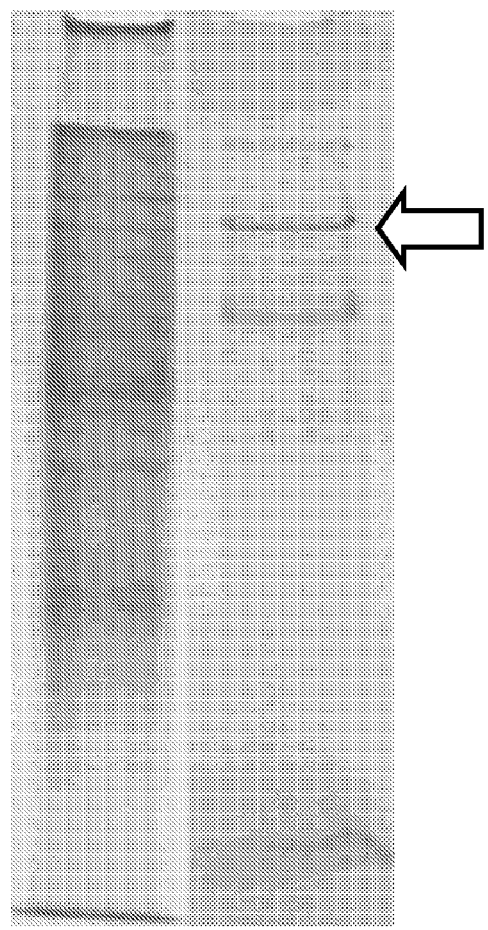

Native PAGE (7.5%) of *A. terreus* NADP-GDH:

Lane 1—A desalted ammonium sulfate (30-70%) fraction; Lane 2—Peak protein fraction (FIG. 1) from the BS-212 column (Arrow indicates the position of NADP-GDH protein)

What is claimed is:

1. A process for the separation of biological materials, which process comprises treating or contacting biological materials with an adsorbent comprising a reaction product of a compound of formula (3), (4) or (5)

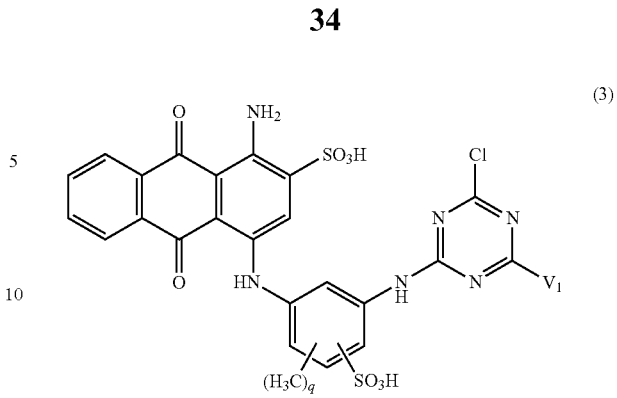

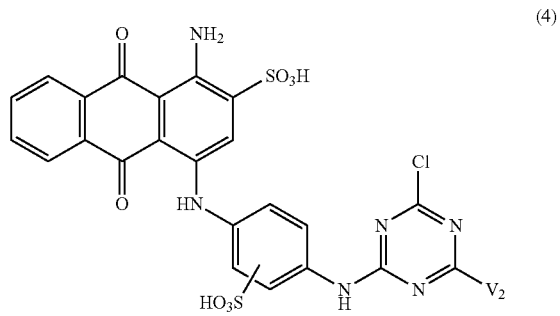

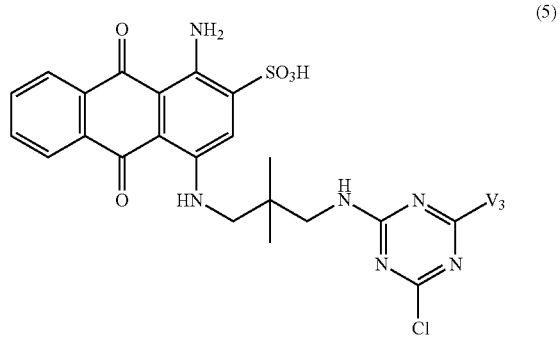

wherein $V_1$ is β-hydroxyethylamino, 2-(β-hydroxyethoxy)ethylamino or morpholino, $V_2$ and $V_3$ each independently of the other are β-hydroxyethylamino, 2-(β-hydroxyethoxy)ethylamino, N,N-di-β-hydroxyethlamino or morpholino and q is the number 0, 1, 2 or 3 and a substrate having a group capable of reaction with a reactive group in said compound of formula (3), (4) or (5) to form a covalent bond.

2. A process according to claim 1, wherein the compound of formula (3), (4) or (5) is selected from the group consisting of (3a), (3b), (3c), (3d), (3e), (3f), (4a), (4b), (4c), (4d), (4e), (4f), (4g), (4h), (5a), (5b), (5c) and (5d)

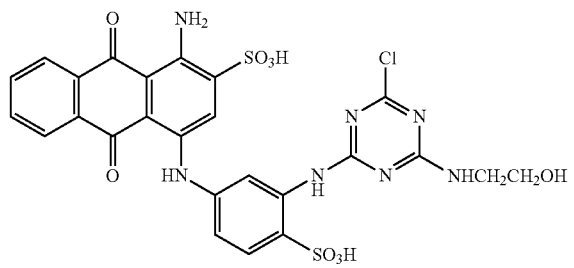
(3a)
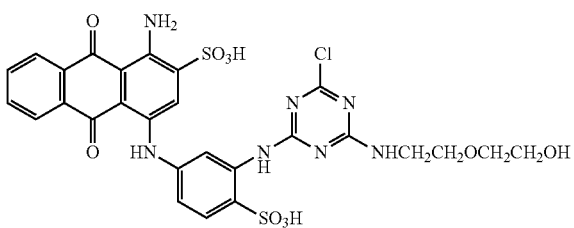
(3b)
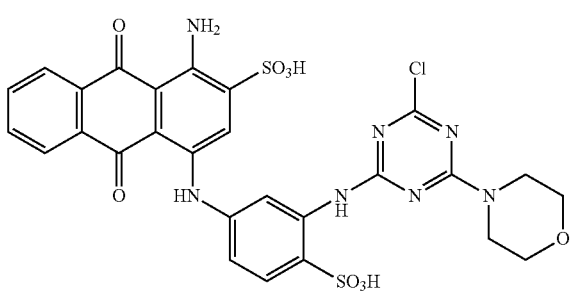
(3c)
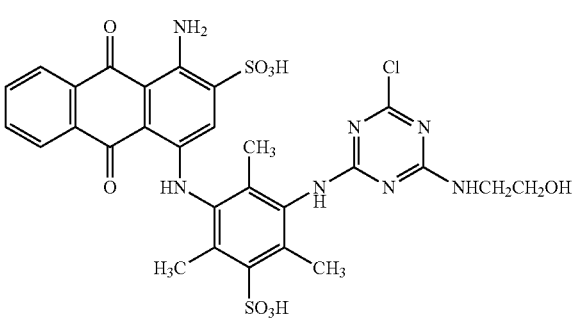
(3d)
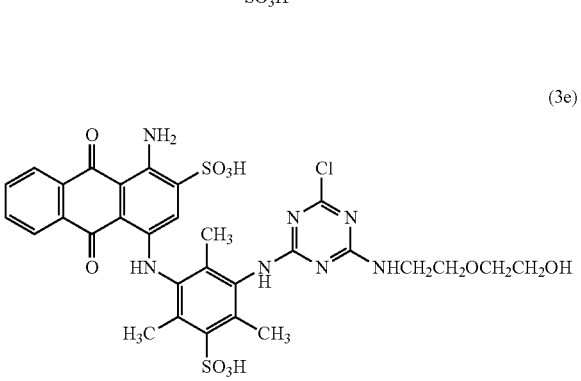
(3e)
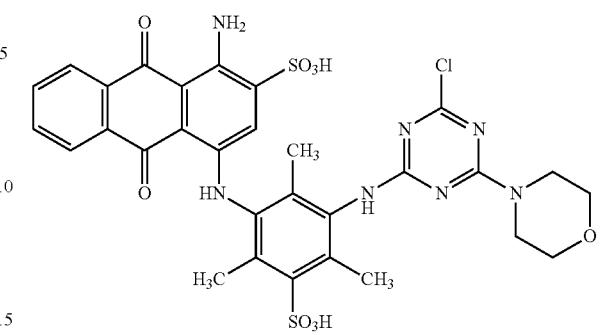
(3f)
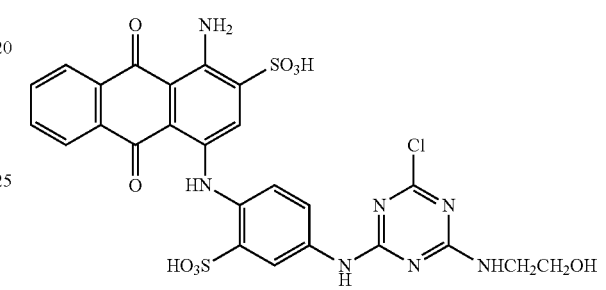
(4a)
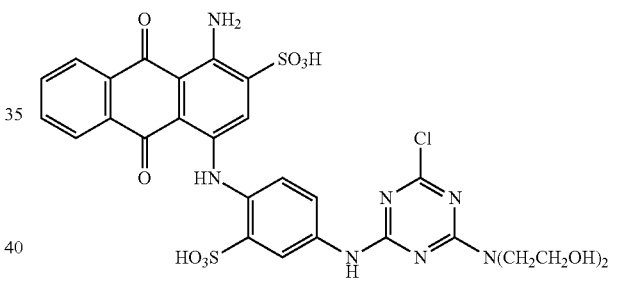
(4b)
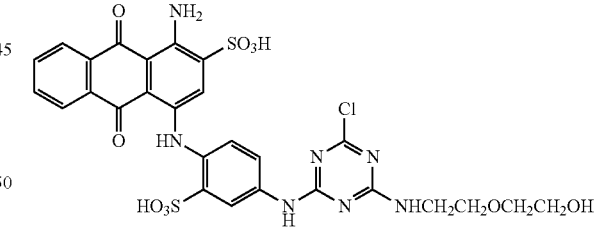
(4c)
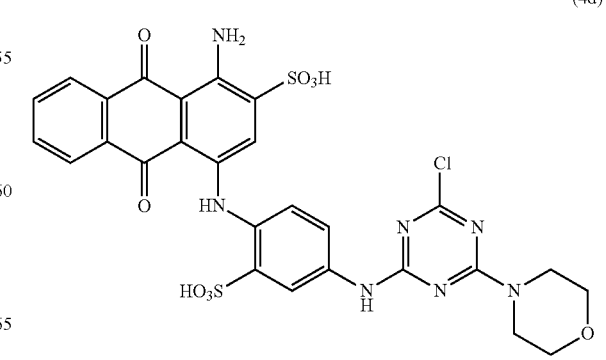
(4d)

(4e)
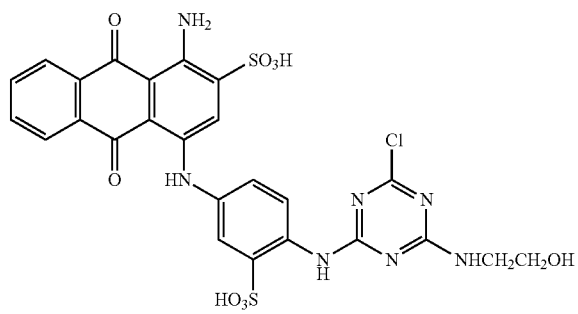
(4f)
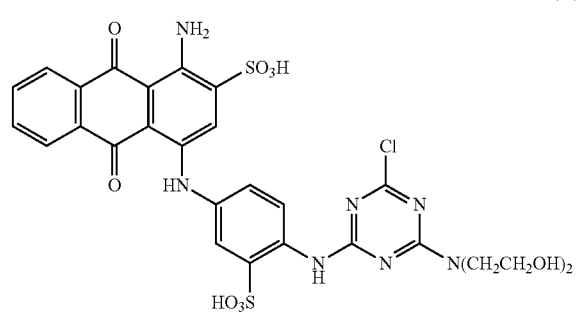
(4g)
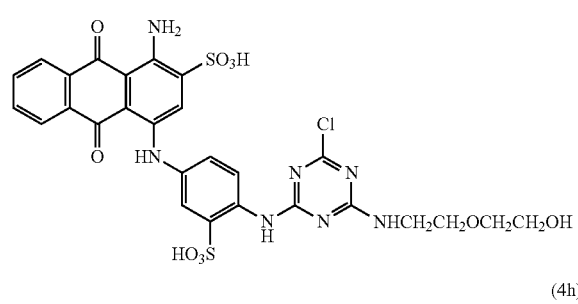
(4h)
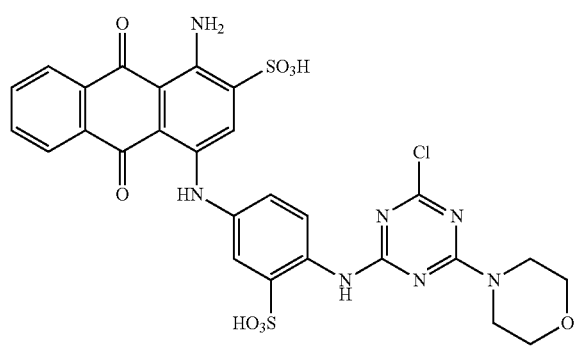
(5a)
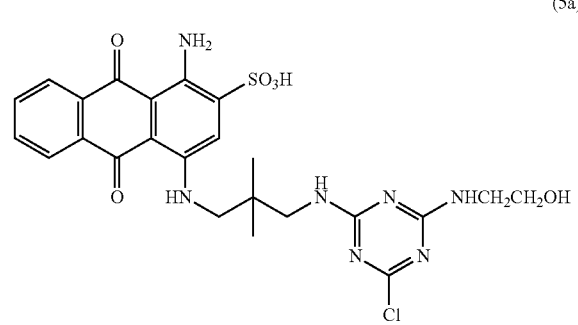
(5b)
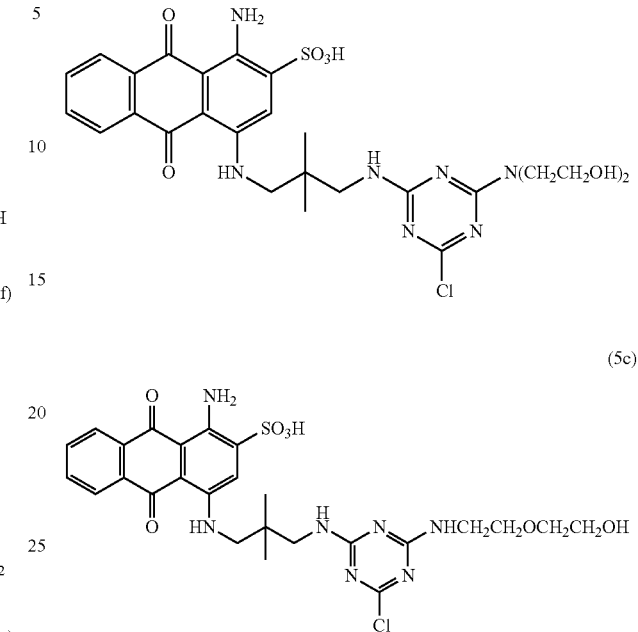
(5c)
(5d)
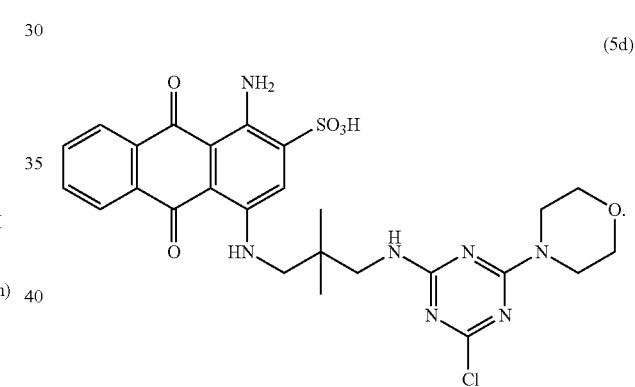
3. A process according to claim 1, wherein the substrate is a carbohydrate or a modified carbohydrate.
4. Adsorbent for the separation of biological materials, which comprises a reaction product of a compound of formula (3), (4) or (5)
(3)
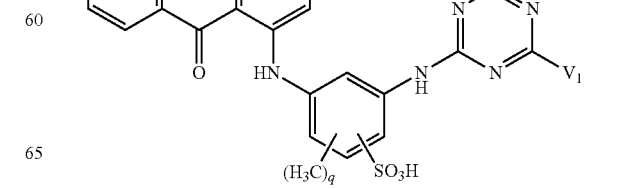

-continued

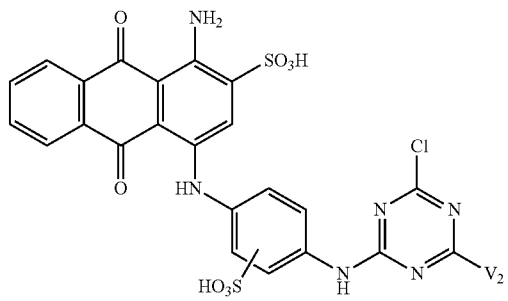
(4)

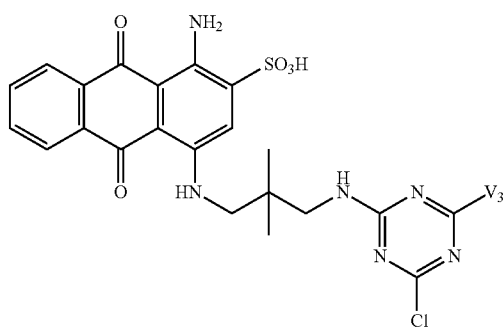
(5)

wherein $V_1$ is β-hydroxyethylamino, 2-(βhydroxyethoxy)ethylamino or morpholino, $V_2$ and $V_3$ each independently of the other are β-hydroxyethylaminoe, 2(β-hydroxyethoxy)ethylamino, N,N-di-β-hydroxyethylamino or morpholino and q is the number 0, 1, 2 or 3 and a substrate having a group capable of reaction with a reactive group in said compound of formula (3), (4) or (5) to form a covalent bond.

5. A process for the preparation of an adsorbent, which process comprises reacting a compound of formula (3), (4) or (5)

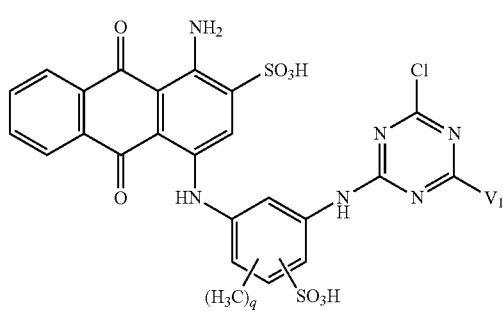
(3)

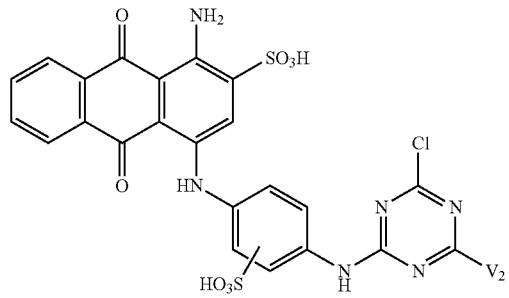
(4)

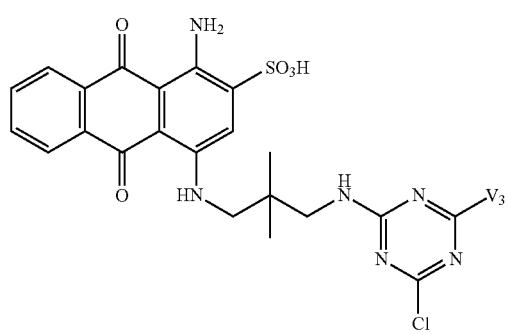
(5)

wherein $V_1$ is β-hydroxyethylamino, 2-(βhydroxyethoxy)ethylamino or morpholino, $V_2$ and $V_3$ each independently of the other are β-hydroxyethylamino, 2(β-hydroxyethoxy)ethylamino, N,N-di-β-hydroxyethylamino or morpholino and q is the number 0, 1, 2 or 3 with a substrate having a group capable of reaction with a reactive group in said compound of formula (3), (4) or (5) to form a covalent bond in the presence of an acid binding agent.

6. Compounds of formulae (3), (4) or (5)

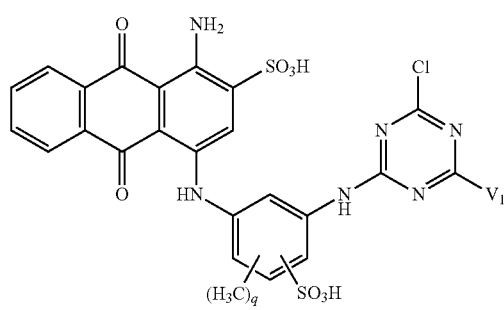
(3)

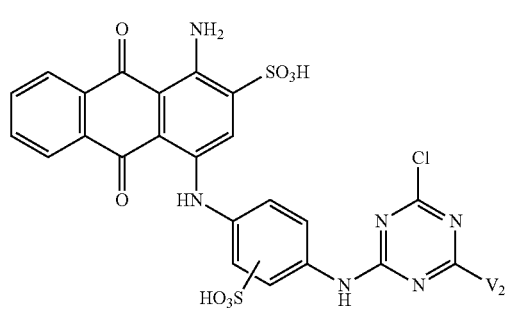
(4)

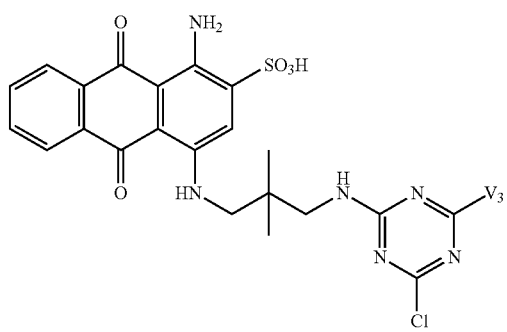

(5)

wherein
- $V_1$ is β-hydroxyethylamino, 2-(βhydroxyethoxy)ethylamino or morpholino,
- $V_2$ and $V_3$ each independently of the other are β-hydroxyethylamino, 2(β-hydroxyethoxy)ethylamino, N,N-di-β-hydroxyethylamino or morpholino and
- q is the number 0, 1, 2 or 3.

7. A process according to claim 3, wherein the substrate is a carbohydrate or a modified carbohydrate selected from agarose, cross-linked agarose, dextrose, dextrans and modified versions thereof.

* * * * *